United States Patent Office
3,531,487
Patented Sept. 29, 1970

3,531,487
4-(N,N-DISUBSTITUTED-AMINO)-PIPERIDINES
Leo Berger, Montclair, Alfred John Corraz, Wayne, and John Lee, Stockton, N.J., assignors to Hoffmann-La Roche Inc., Nutley, N.J., a corporation of New Jersey
No Drawing. Filed Oct. 25, 1966, Ser. No. 589,246
Int. Cl. C07d 29/28
U.S. Cl. 260—293
23 Claims

ABSTRACT OF THE DISCLOSURE

This disclosure relates to 4 - (N - methyl - N - aralkylamino) piperidines and to processes for their preparation. The aforesaid compounds are useful as analgesics and as mild appetite suppressants.

---

This invention relates to a novel class of tertiary amines and to novel intermediates and processes useful in the preparation thereof. More particularly, the invention relates to novel 4 - (N - methyl - N - aralkylamino)piperidines of the formula

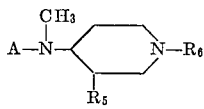

wherein A represents an aralkyl group; $R_5$ is hydrogen, lower alkyl or phenyl-lower alkyl; and $R_6$ is lower alkyl or phenyl-lower alkyl and medicinally acceptable salts thereof.

The term "lower alkyl" as used herein denotes a straight or branched chain hydrocarbon group containing 1–7 carbon atoms, e.g., methyl, ethyl, propyl, isopropyl, butyl, tertiary butyl, etc. The term "lower alkoxy" denotes lower alkyl ether groups in which the lower alkyl moiety is as defined above. The term "halogen" denotes all of the halogens i.e., bromine, chlorine, fluorine and iodine. Bromine and chlorine are preferred. The term "aralkyl" denotes a straight or branched chain lower alkyl group in which one or more of the hydrogen atoms have been replaced by an aryl group. The term "aryl" as used herein denotes phenyl or phenyl bearing one or more substituents selected from the group consisting of halogen, trifluoromethyl, lower alkyl, lower alkoxy, nitro, amino, lower alkylamino and di-lower alkylamino.

The preferred aralkyl groups of this invention are groups of the formula

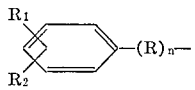

wherein R is methylene or methylene substituted by a member selected from the group consisting of lower alkyl, phenyl, phenyl-lower alkyl and phenyl or phenyl-lower alkyl in which the phenyl ring is substituted by halogen, trifluoromethyl, lower alkyl, lower alkoxy, nitro, amino, lower alkylamino or di-lower alkylamino; $R_1$ and $R_2$ are each independently selected from the group consisting of hydrogen, halogen, trifluoromethyl, lower alkyl, lower alkoxy, nitro, amino, lower alkylamina and di-lower alkylamino; and $n$ is an integer from 1 to 4.

Thus, in a more specific embodiment the novel compounds of this invention can be represented by the formula

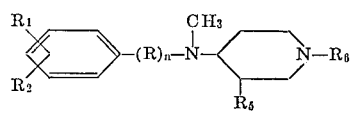

wherein R, $R_1$, $R_2$, $R_5$, $R_6$ and $n$ have the same meaning as hereinabove. Compounds of Formula I–b above wherein $n$ is 2 constitute a preferred group which can be represented by the formula

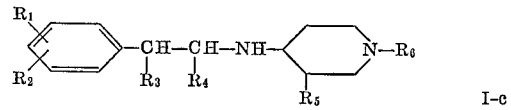

wherein $R_1$, $R_2$, $R_5$ and $R_6$ have the same meaning as hereinabove; and $R_3$ and $R_4$ are each individually selected from the group consisting of hydrogen, lower alkyl, phenyl, phenyl-lower alkyl, substituted phenyl and substituted phenyl-lower alkyl wherein the phenyl substituents are as defined above. Especially preferred are compounds of Formula I–c above wherein $R_1$ is hydrogen and $R_2$ is in para position and one of $R_3$ and $R_4$ is hydrogen and the other is lower alkyl, phenyl or phenyl-lower alkyl, i.e., compounds of the formula

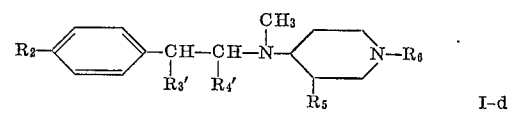

wherein $R_2$, $R_5$ and $R_6$ have the same meaning as above; and one of $R_3'$ and $R_4'$ is hydrogen and the other is lower alkyl, phenyl or phenyl-lower alkyl.

The novel end products of this invention, i.e., the tertiary amines of the Formula I can be obtained by a variety of methods. Compounds of Formula I can, for example, be obtained by reduction and N-methylation of the enamide obtained by the condensation of an aromatic carboxylic acid amide with a substituted 4-piperidone as illustrated by the following reaction sequence.

METHOD A

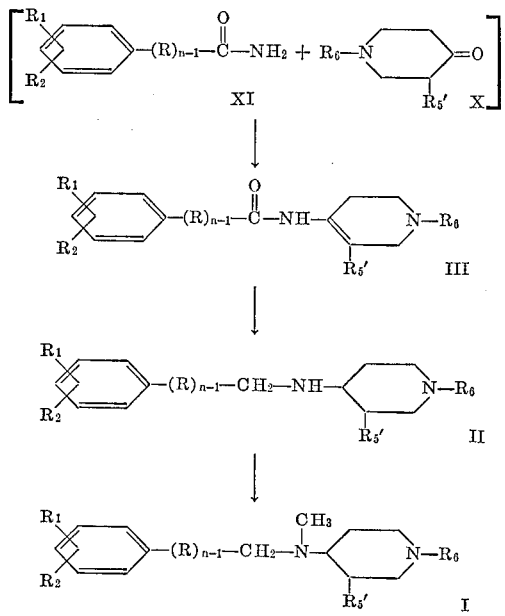

wherein the symbols R, $R_1$, $R_2$, $R_6$ and $n$ have the same meaning as hereinabove; and $R_5'$ is lower alkyl or phenyl lower alkyl.

The condensation of an amide of Formula XI with a 4-piperidone of Formula X is suitably carried out in the presence of either sulfuric acid or a mixture of phosphorous pentoxide and ortho-phosphoric acid. A mixture of phosphorous pentoxide and ortho-phosphoric acid is preferred. In general, from about 2.5 to about 10.0 and preferably from about 5 to about 6 parts by weight of phosphorous pentoxide and from about 2.5 to about 10.0, preferably from about 5 to about 6 parts by weight of ortho-phosphoric acid is employed based on the weight of the amide. The phosphoric acid can be anhydrous, but preferably a small quantity of water is present, i.e., up to about 15 percent water, e.g., 85 percent phosphoric acid. The reaction is carried out at a temperature in the range of from about 50° to about 160°, preferably from about 80° to about 110°. When sulfuric acid is employed, the sulfuric acid is preferably anhydrous, but can contain up to about 2 percent water. From about 0.85 to about 1.2 parts by weight of sulfuric acid based on the weight of aralkyl amide is usually employed. When sulfuric acid is used, an organic solvent, e.g., chloroform, carbon tetrachloride, methyl chloride, hydrocarbon solvents such as benzene, heptane, etc., can be employed. The enamide obtained in the condensation is isolated from the reaction mixture by neutralizing with alkali, preferably in aqueous solution thereby precipitating the product which is easily removable from the neutralized aqueous solution, for example, by filtration. Upon treating the enamide with lithium aluminum hydride-aluminum chloride, it was surprisingly found that the tetrahydropyridyl moiety is reduced along with the carbonyl group to give the secondary amine intermediates of Formula II, which upon methylation with formaldehyde and formic acid, give the novel tertiary amines of this invention. The reduction with lithium aluminum hydride-aluminum chloride is preferably carried out under anhydrous conditions in the presence of an inert organic solvent such as ether, etc. The reaction is suitably carried out at an elevated temperature, preferably at a temperature between about 20° and about 80° C. The secondary amine intermediate is separated from the reaction mixture by extraction and can be methylated without further purification if desired. Methylation of the secondary amine is carried out by treating with an aqueous solution of formaldehyde and formic acid at an elevated temperature, preferably at a temperature between about 80° and about 100° C. The tertiary amine product is isolated by making the reaction mixture alkaline and extracting with ether. The lithium aluminum hydride aluminum chloride reduction proceeds in a stereoselective fashion resulting in a mixture of cis and trans isomers in which the trans isomer is predominant. The isomeric mixture obtained usually contains the trans and the cis isomers in a ratio of about 9:1. Separation of the isomers can be readily accomplished by any of the usual techniques, such as fractional crystallization of selected salts or separation on an alumina column.

The secondary amine intermediates of Formula II are also novel compounds and thus constitute a part of this invention.

Alternatively, the novel tertiary amines of this invention can be obtained by a Schiff's base condensation procedure which can be traced according to the following schematic diagram.

METHOD B

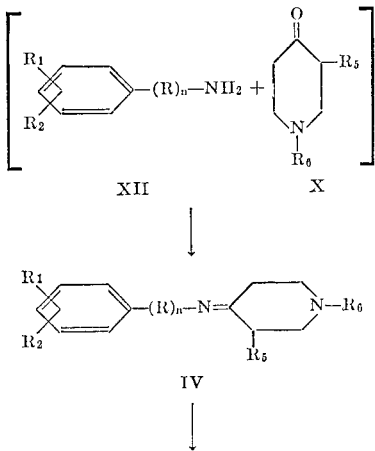

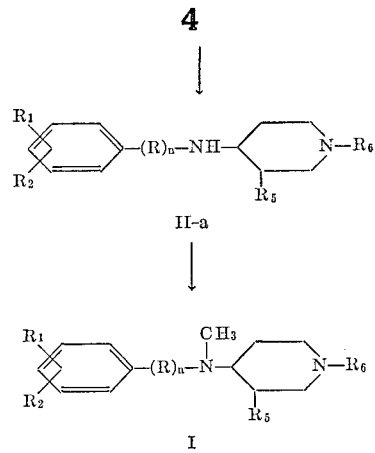

wherein R, $R_1$, $R_2$, $R_5$, $R_6$ and $n$ have the same meaning as hereinabove.

The Schiff's base of Formula IV is readily obtained by condensation of an appropriate aralkyl amine of Formula XII with a 4-piperidone of Formula X. The condensation is conveniently carried out in the presence of an inert organic solvent at an elevated temperature, preferably a temperature in the range of from about 80° to about 110° C. Suitable solvents employed in the condensation are, for example, hydrocarbons, such as benzene, toluene, etc. Reduction of the Schiff's base to form the secondary amine intermediates of Formula II-a can be accomplished by either a chemical reduction or a catalytic hydrogenation. The chemical reduction can be accomplished by utilizing a suitable chemical reducing agent such as formic acid, a metal hydride, e.g., $NaBH_4$, $LiAlH_4$; and the like. For the catalytic reduction there can be employed any of the usual hydrogenation catalysts, such as Raney nickel, platinum oxide, palladium and the like.

The product obtained upon reduction of compounds of Formula IV wherein $R_5$ is other than hydrogen is ordinarily a mixture of cis and trans isomers with the cis isomer usually being predominant. The reaction can be made selective for either isomer by appropriate selection of reaction conditions and/or reducing agent. Thus, the ratio of trans:cis isomers in the isomeric mixture obtained as product in the reduction reaction can be made to vary over a wide range. The following table shows the composition of the isomeric mixtures obtained when the reduction reaction was carried out with several exemplary reducing systems.

| Reducing system | Ratio of isomers in product | |
|---|---|---|
| | Trans | Cis |
| $NaBH_4$/EtOH | 40 | 60 |
| Pd/HCl/EtOH/$H_2$ | 25 | 75 |
| $LiAlH_4$ | 9 | 91 |
| $PtO_2$/MeOH | 20 | 80 |
| HCOOH | 20 | 80 |
| Raney Ni | 7 | 93 |

Separation of the isomers can be effected in the usual manner, e.g., alumina column, etc. The intermediates of Formula IV are also novel compounds which constitute a part of this invention.

In yet another alternative synthesis, the tertiary amines of Formula I can be prepared by condensing a 1,3-disubstituted-4-amino-piperidine with an aralkyl acid halide or an ester of an aralkyl acid, reducing the so-formed amine and methylating as above. This reaction sequence can be traced with respect to the following diagram.

METHOD C

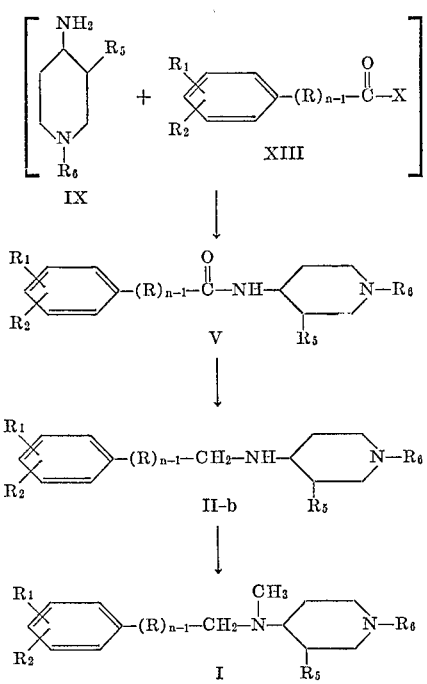

wherein R, $R_1$, $R_2$, $R_5$, $R_6$ and $n$ have the same meaning as hereinabove and X is halogen (preferably bromine or chlorine), alkoxy or aralkoxy (preferably lower alkoxy).

The condensation of a 4-amino-piperidine of Formula IX with an aralkylacyl derivative of Formula XIII can be suitably effected at a temperature between about room temperature and the boiling point of the reaction mixture, though higher or lower temperatures can be utilized. It is preferred to operate at an elevated temperature, conveniently at a temperature between about 50° C. and 150° C. The reaction is conveniently carried out in the presence of an inert organic solvent. Any suitable solvent such as, for example, a hydrocarbon, e.g., benzene, toluene, etc., ether and the like can be utilized. Upon completion of the reaction, the product is readily recovered by the usual techniques, i.e., extraction and filtration.

When $R_5$ is other than hydrogen the condensation product can be obtained as either the cis or trans isomer or as an isomeric mixture depending upon the configuration of the 4-aminopiperidine starting material of Formula IX. When the condensation product is obtained as an isomeric mixture, it can, if desired, be separated by the usual methods, e.g., fractional crystallization, etc. prior to the reduction step or the isomeric mixture can be submitted to reduction without separating the isomers.

The compounds of Formula IX wherein $R_5$ is other than hydrogen are also novel compounds, the preparation of which will be more fully described hereinbelow. The intermediates of Formula V are also novel and thus constitute part of this invention.

In carrying out the reduction of compounds of Formula V it is preferred to employ borane as reducing agent. Reduction with borane does not alter the steric configuration of the product. Thus, it is possible to obtain, for example, a secondary amine of Formula II-b as pure trans isomer by employing as starting material pure trans isomer of the 4-aminopiperidine of Formula IX, wherein $R_5$ is other than hydrogen. The reduction is conveniently carried out in an inert organic solvent, such as tetrahydrofuran, dioxane, and the like, and at a temperature between about 0° C. and the reflux temperature of the reaction mixture, though higher or lower temperatures can also be employed.

In still another method a substituted 4-amino-piperidine can be condensed with an aralkyl aldehyde to give an imine which upon reduction gives the secondary amine intermediates of Formula II-b as outlined in the following reaction sequence.

METHOD D

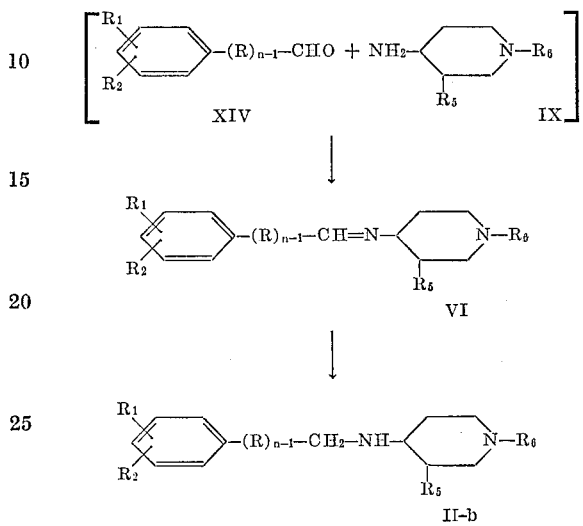

wherein R, $R_1$, $R_2$, $R_5$, $R_6$ and $n$ have the same meaning as hereinabove. The tertiary amine end products are obtained by methylation as described hereinabove.

The condensation of a 4-amino-piperidine of Formula IX with an appropriate aralkyl aldehyde of Formula XIV is conveniently carried out in the presence of an inert organic solvent, e.g., hydrocarbon solvents such as benzene, toluene and the like, and suitably at an elevated temperature, preferably at a temperature between about room temperature and the reflux temperature of the reaction mixture. When $R_5$ is other than hydrogen the condensation product can be obtained as either the cis or trans isomer or as an isomeric mixture depending upon the configuration of the 4-amino-piperidine starting material. Isomeric mixtures can be separated into pure isomeric forms by the usual techniques. The reduction of the imines to give the secondary amine intermediates of Formula II-b is readily accomplished by employing a suitable chemical reducing agent. The preferred reducing agents are the alkyl metal hydrides, e.g., sodium borohydride, lithium aluminum hydride and the like. If desired, the reduction of imines of Formula VI can also be carried out catalytically with any of the usual hydrogenation catalyst such as Raney nickel, platinum, palladium, platinum oxide, palladium-on-carbon and the like. The reduction is conveniently carried out in the presence of an inert organic solvent such as a lower alkanol and the like and suitably at an elevated temperature, preferably at a temperature between about room temeprature and the reflux temperature of the reaction mixture. The reaction product of the reduction of compounds of Formula VI wherein $R_5$ is other than hydrogen can be obtained as either the cis or trans isomer or as an isomeric mixture which can be separated by the usual techniques. The ratio of cis:trans in the reaction product is determined by the configuration of the 4-aminopiperidine starting material. The intermediates of Formula VI are also novel and thus constitute part of this invention.

In another alternative method the secondary amine intermediates of Formula II-a can be obtained by condensing a substituted 4-amino-piperidine with an appropriate aralkyl halide according to the following reaction sequence.

METHOD E

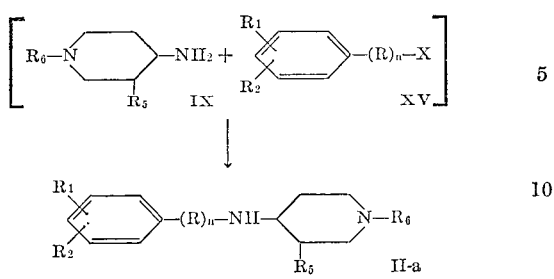

wherein R, $R_1$, $R_2$, $R_4$, $R_5$ and $n$ all have the same meaning as hereinabove and X is a leaving group such as halogen, preferably chlorine.

The condensation with an aralkyl halide of Formula XV is conveniently carried out in the presence of an inert organic solvent such as a hydrocarbon solvent, e.g., benzene, an alkanol, e.g. ethanol, a ketone, e.g., acetone, dimethylformamide, dimethylsulfoxide, and the like, and preferably at an elevated temperature, suitably at a temperature between about room temperature and the reflux temperature of the reaction mixture. The condensation reaction can be enhanced by employing an appropriate condensing agent such as an alkali metal carbonate, e.g., potassium carbonate, sodium carbonate and the like. The secondary amine product obtained in this condensation can be readily recovered by the usual work-up procedures, i.e., extraction and filtration. Methylation with formaldehyde/formic acid as described above gives the desired tertiary amine end products of Formula I.

In yet another procedure analogous to that of Method E above the tertiary amine end products of this invention can be obtained directly by condensing a substituted 4-methylaminopiperidine with an aralkyl halide as outlined in the following reaction sequence.

METHOD F

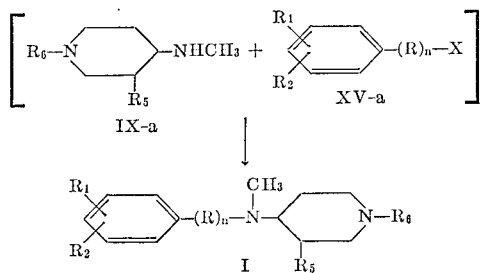

wherein R, $R_1$, $R_2$, $R_5$, $R_6$ and $n$ have the same meaning as hereinabove and X is a leaving group such as halogen, preferably chlorine.

The consendation with the 4-methylamino-piperidine is conveniently carried out in analogy to the above-described condensation with a 4-amino-piperidine. The product can also be obtained as either cis or trans isomers or an isomeric mixture depending upon the configuration of the 4-methylamino-piperidine starting material. The 4-methylamino-piperidine starting materials of formula IX–a wherein $R_5$ is other than hydrogen are novel compounds, the preparation of which will be more fully described hereinbelow.

By still another alternative the end products of Formula I can be obtained via reduction of an enamine obtained by the condensation of a substituted 4-piperidone of Formula X with a secondary N-aralkyl-N-methylamine. This alternative can be traced with respect to the following schematic diagram.

METHOD G

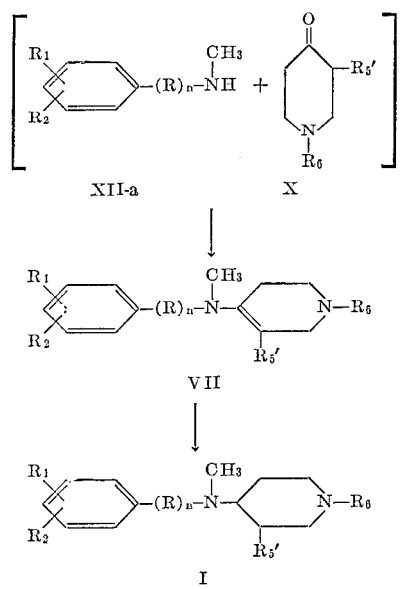

wherein $R_1$, $R_2$, $R_5'$, $R_6$ and $n$ have the same significance as hereinabove.

The condensation of a secondary amine of Formula XII–a with a substituted 4-piperidone of Formula X is conveniently carried out in an inert organic solvent such as a hydrocarbon solvent, e.g., toluene, xylene and the like, and preferably at an elevated temperature suitably at a temperature between about room temperature and the reflux temperature of the reaction mixture. The reaction is facilitated by removal of the water formed during the course of the reaction. The 4-(N-aralkyl-N-methylamino)-piperidine condensation product of Formula VII is recovered by the usual techniques, e.g., distillation and the like. The subsequent reduction may be accomplished by catalytic hydrogenation. Suitable catalysts are, for example, the noble metal catalysts such as palladium, platinum-on-carbon, platinum oxide and the like. The reduction is preferably carried out in the presence of an organic solvent. Suitable solvents are, for example, alkanols, dioxane, tetrahydrofuran and the like. The reaction can be conveniently effected at room temperature. Higher or lower temperatures can be employed though it is preferred to operate between about room temperature and about 100° C. The catalytic hydrogenation of compounds of Formula VII wherein $R_5$ is other than hydrogen produces an isomeric mixture with the cis-isomer being predominant. Separation of the isomers can be effected by the usual techniques such as alumina column and the like. The compounds of Formula VII are novel intermediates which also constitute part of this invention.

In still another process the end products of Formula I can be obtained by reduction of a 4-(N-aralkenyl-N-methylamino)-piperidine derivative obtained by condensing a substituted 4-methylamino-piperidine of Formula IX-a with an aralkyl aldehyde of Formula XIV according to the following reaction sequence.

METHOD H

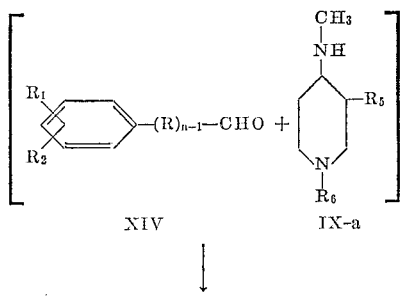

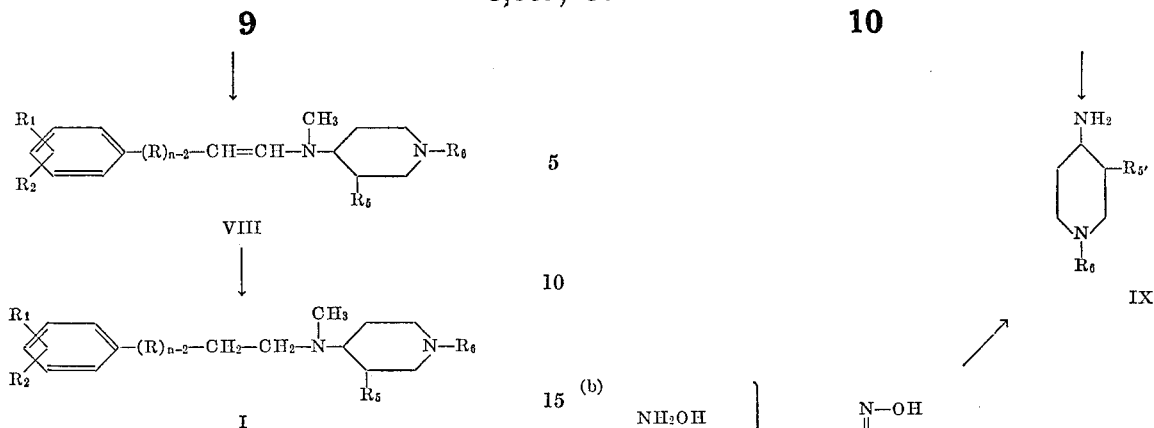

wherein $R_1$, $R_2$, $R_5$, $R_6$ and $n$ have the same significance as hereinabove.

The condensation of a 4-(N-methylamino)-piperidine of Formula IX-a with an aralkyl aldehyde of Formula XIV is carried out in analogy to Method D described hereinabove. The 4-(N - aralkenyl-N-methyl)-piperidine product of Formula VIII can be obtained as either the cis or trans isomer or as an isomeric mixture depending upon the configuration of the 4-(N-methylamino)-piperidine starting material. The reduction of the compounds of Formula VIII may be brought about by hydrogenation in the presence of a catalyst such as Raney nickel, palladium, platinum, palladium-on-charcoal and the like. The reaction is preferably carried out in an inert organic solvent such as lower alkanols, dioxane, tetrahydrofuran and the like and preferably at a temperature between about room temperature and 100° C. The intermediates of Formula VIII are also novel and thus constitute part of this invention.

As noted above, the 4-amino-piperidine starting materials of the formula

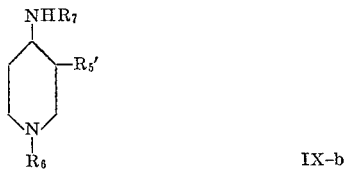

wherein $R_5'$ and $R_6$ are each lower alkyl or phenyl-lower alkyl and $R_7$ is hydrogen or methyl are novel compounds and thus constitute a part of this invention.

Compounds of Formula IX-b wherein $R_7$ is hydrogen are prepared by reacting an appropriately substituted 4-piperidone with hydroxylamine to give the corresponding oxime which upon reduction yields the desired 4-amino-1,3-di-substituted-piperidine.

Alternatively, the 4-amino-1,3-di-substituted piperidines of Formula IX-b wherein $R_7$ is hydrogen can be obtained by first preparing the corresponding 4-acylamino-tetrahydropyridine, reducing the tetrahydropyridine, and eliminating the acyl group by hydrolysis. These alternative syntheses for the preparation of the 4-amino-piperidine starting materials wherein $R_7$ is hydrogen can be traced with respect to the following diagram.

METHOD I

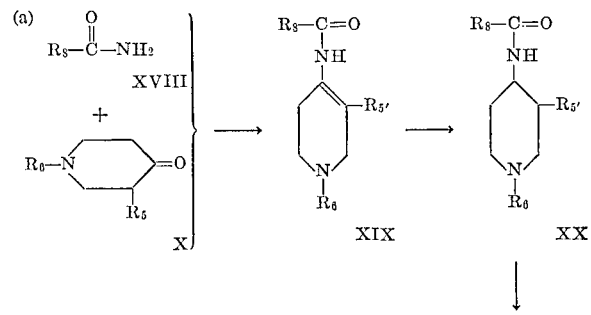

wherein $R_5'$ and $R_6$ are each lower alkyl or phenyl lower alkyl and $R_8$ is lower alkyl.

In the first alternative designated as (a) in the above Method I the preparation of an enamide of Formula XIX is carried out in analogy to the preparation of enamides as described in connection with Method A hereinabove. Selective reduction of only the tetrahydropyridyl moiety of the enamides of Formula XIX gives a 4-acylamino-piperidine which is readily hydrolyzed to a 4-amino-piperidine of Formula IX. The reduction of compounds of Formula XIX is readily accomplished by hydrogenating in the presence of a catalyst. Suitable catalysts are, for example, the metal catalysts such as Raney nickel, palladium, palladium-on-carbon, platinum and the like. The reduction is preferably carried out in the presence of an inert organic solvent such as lower alkanols, dioxane, tetrahydrofuran and the like and preferably at a temperature between about room temperature and about 100° C. The Formula XX products of the reduction are obtained as an isomeric mixture of cis and trans forms with the cis form being predominant. Separation of the isomers can be accomplished by any of the usual techniques. Hydrolysis of the compounds of Formula XX can be readily accomplished by treatment with any of the usual organic or inorganic acids. The 4-amino-piperidine intermediates of Formula IX are obtained in either the cis or trans form or as isomeric mixtures thereof depending upon the configuration of the amide of Formula XX.

The alternative preparation of compounds of Formula IX designated as (b) in the foregoing schematic diagram Method I is conveniently carried out by condensing a substituted piperidone of Formula X with hydroxylamine in the presence of an inert organic solvent such as lower alkanols and the like. The reaction temperature is not critical though it is preferred to operate at an elevated temperature suitably at a temperature between about room temperature and the reflux temperature of the reaction mixture. It is preferred to utilize the hydroxylamine starting material in the form of an acid addition salt, e.g., hydroxylamine hydrochloride, in which case the oxime product of Formula XVI is also obtained as the acid addition salt. The acid addition salt can be readily converted to the free oxime by treatment with alkali such as sodium hydroxide, potassium hydroxide and the like. The oximes of Formula XVI are readily converted to the 4-amino-piperidines of Formula IX by either a chemical reduction or by hydrogenation in the presence of a catalyst. The chemical reduction is readily accomplished by means of any of the usual chemical reducing agents, e.g., sodium in alcohol, sodium amalgamate, complex metal hydrides such as sodium borohydride, lithium borohydride, lithium aluminum hydride, and the like. The chemical reduction is conveniently carried out in the presence of an inert organic solvent such as lower alkanols, dioxane, tetrahydrofuran and the like and suitably at room temperature though higher or lower temperatures, e.g., temperatures between about 0° C. and about 100° C., can also be employed. Catalytic hydrogenation is conveniently carried out in the presence of an inert organic solvent such as lower alkanols, dioxane, tetrahydrofuran and the like utilizing any of the usual hydrogenation catalysts such as Raney nickel, palladium, platinum, palladium-on-carbon and the like. The catalytic reduction can be conveniently carried out at room temperature and atmospheric pressure though higher or lower temperatures and elevated pressures can also be employed. The reduction of compounds of Formula XVI can give compounds of Formula IX in either the cis or trans form or as isomeric mixtures of cis and trans forms. By appropriate selection of the reducing system the desired isomer can be obtained as the predominant isomer in the reaction product. Exemplary reducing systems and the ratio of trans:cis isomers present in the reaction product are shown in the following table:

| Reducing system | Trans | Cis |
| --- | --- | --- |
| Raney nickel | 50 | 50 |
| Pd/HOAc | 85 | 15 |
| Na/isoPrOH | 90 | 10 |
| LiAlH$_4$ | 40 | 60 |
| Na/NH$_3$/EtOH | 100 | 0 |

The compounds of Formulas XVI, XIX and XX are also per se novel and thus constitute part of this invention.

Compounds of Formula IX-b wherein $R_7$ is methyl are prepared from substituted 4-methylimino-piperidines by direct reduction or, alternatively, by acylation followed by reduction and hydrolysis as outlined in the following reaction scheme.

METHOD J

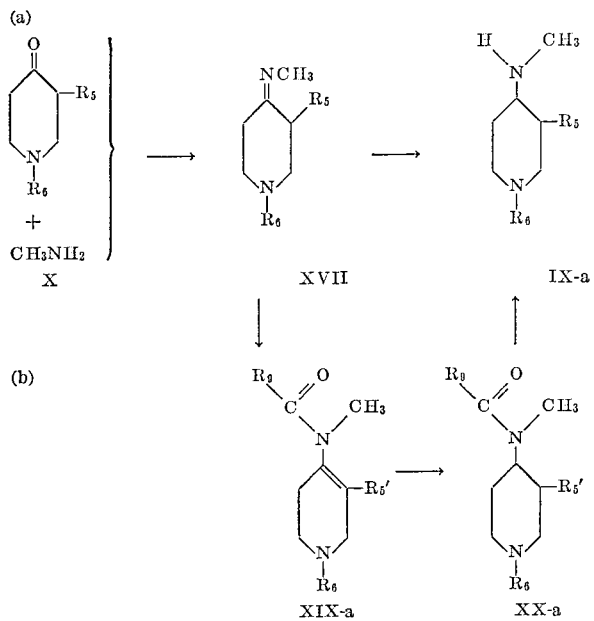

wherein $R_5$, $R_5'$ and $R_6$ have the same significance as hereinabove and $R_9$ is alkyl, aryl or aralkyl. Preferably, $R_9$ is lower alkyl, phenyl, phenyl lower alkyl or phenyl or phenyl lower alkyl in which the phenyl nucleus is substituted by halogen, lower alkyl, lower alkoxy, trifluoromethyl, amino, lower alkylamino or di-lower alkylamino.

The 4-methylimino-piperidine derivatives of Formula XVII are prepared by treating the appropriately substituted piperidone-4 of Formula X with mono-methylamine gas. The reaction is suitably carried out in the presence of an inert organic solvent such as, for example, hydrocarbon solvents, e.g., benzene, toluene and the like, and suitably at an elevated temperature preferably at a temperature between about room temperature and the reflux temperature of the reaction mixture. Reduction of the compounds of Formula XVII can be readily carried out by means of a dissolving metal reduction, e.g., with sodium in alcohol preferably ethanol. The dissolving metal reduction is preferably carried out under substantially anhydrous conditions and preferably at an elevated temperature, e.g., at a temperature between about room temperature and the reflux temperature of the reaction mixture. If desired, the reduction of compounds of Formula XVII can also be accomplished catalytically with the usual hydrogenation catalysts such as Raney nickel, platinum oxide and the like. Compounds of Formula XIX-a wherein $R_5$ is other than hydrogen can be obtained as either the cis or trans isomer. The product of the reduction is usually obtained as an isomeric mixture with the trans isomer being predominant. Separation of the isomers can be accomplished by any of the usual techniques such as alumina column separation, etc.

Alternatively, the compounds of Formula IX-a wherein $R_5$ is other then hydrogen can be obtained by acylating the appropriate imino derivative of Formula XVII whereby there is obtained an enamide of Formula XIX-a. Selective reduction of the tetrahydropyridyl moiety of the enamide followed by acid hydrolysis gives compounds of Formula XIX-a. The acylation can be effected by any of the usual acylating techniques such as, for example, by treatment with an acid anhydride preferably a lower alkanoic acid anhydride, e.g., acetic anhydride, etc. or an acyl halide, e.g., benzoyl halide or a substituted benzoyl halide. Reduction of the enamides of Formula XIX-a is accomplished by catalytic hydrogenation preferably at an elevated temperature, e.g., at a temperature between about room temperature and about 150° C., and at an elevated pressure, e.g., between about atmospheric pressure and 70 atmospheres. As catalyst it is preferred to employ the Noble metal catalysts especially rhodium-on-carbon, etc. The hydrogenation product of Formula XX-a is obtained as an isomeric mixture of cis and trans forms with the trans form being predominant. Separation of the isomers can be accomplished by any of the usual techniques, e.g., separation on an alumina column. Hydrolysis of the compounds of Formula XX-a to form compounds of Formula XIX-a is readily accomplished by treatment with any of the usual organic or inorganic acids at room temperature.

The intermediates of Formulas XIX-a and XX-a as well as the intermediates of Formula XVII wherein $R_5$ is other than hydrogen are all novel compounds and thus consistute part of this invention.

The end products of this invention, i.e., compounds of Formula I wherein $R_5$ is other than hydrogen as well as those of the novel 4-substituted-piperidine intermediates wherein $R_5$ is other than hydrogen, can, as has been previously noted, be obtained in diastereoisomeric forms designated as the cis and trans forms and as isomeric mixtures of these forms. Each of the diastereoisomeric forms can also exist in optically isomeric forms or as racemic mixtures of such optically isomeric forms and this invention is intended to include all of the various isomers.

The novel end products of Formula I can be obtained in the form of free bases or as salts thereof. A free base may be converted into its acid addition salts by reaction of the former with a suitable inorganic or organic acid. Preferred salts of the compounds of this invention are obtained from therapeutically acceptable acids, for example, inorganic acids such as mineral acids, e.g., hydrochloric, hydrobromic, phosphoric and the like, or organic acids such as acetic, propionic, lactic, succinic, malei, tartaric, citric, salicylic and the like. Salts may be converted into the free base by treating with base, for example, with an aqueous alkali metal carbonate such as sodium or potassium carbonate and the like.

The starting materials utilized in the processes of this invention for which the preparation has not been specifically described herein are known products or analogs of known products which can be readily prepared by those skilled in the art in analogy to the prior art processes for the preparation of the known starting materials.

The novel end products of this invention, i.e., the compounds of Formula I above, are useful as analgesic agents. More particularly, they are useful as analgesic anti-pyretic agents. Certain of the novel compounds of this invention also exhibit mild appetite suppressant activity and are, therefore, useful to inhibit appetite. Compounds of Formula I wherein $R_5$ is lower alkyl, especially methyl, constitute a preferred group of analgesics and the trans isomers of these compounds have been found to be particularly potent analgesics without the morphine-like side effects.

The novel compounds of Formula I are employed as medicaments in the form of pharmaceutical preparations containing one of these novel compounds as active ingredient in admixture with organic or inorganic solid or liquid pharmaceutical excipients in forms suitable for enteral, for example, oral, or parenteral administration. Suitable excipients are substances that do not react with the new compounds such as, for example, water, gelatin, lactose, starches, magnesium stearate, talc, vegetable oils. benzyl alcohols, gums, polyalkylene glycols, white petroleum jelly, chloesterol and other known medicinal excipients. The pharmaceutical preparations can take the form of, for example, tablets, dragées, capsules or liquid forms such as solutions, suspensions, emulsions and the like. They may be sterilized and/or contain adjuvants such as preserving, stablizing, wetting or emulsifying agents, salts for regulating the osmotic pressure, buffers and the like. They may further contain other therapeutically useful substances. They can be prepared in unit dosage forms suitable for administration with dosage amounts adjusted accorditng to the individual need and the recommendation of the physician.

The novel compounds of this invention as well as their preparation and use will be more fully understood from a consideration of the examples which follow. These example are intended to illustrate the invention and are not to be construed as limitative thereof.

EXAMPLE 1

Preparation of 4-(4-chlorophenethylamino-1,3-dimethylpiperidine (cis-trans isomers) dihydrochloride via enamide process-lithium aluminum hydride reduction 11 g. of anhydrous aluminum chloride dissolved in 150 ml. of ether was added rapidly to a stirring solution of 3 g. of lithium aluminum hydride in 50 ml. of ether. After the reagent complex had stirred at room temperature for 20 min., a suspension of 5 g. of 2-(4-chlorophenyl)-N-(1,2,5,6-tetrahydro-1,3-dimethyl-4-pyridyl) acetamide in 200 ml. of ether was added rapidly, with stirring. Following the last addition, the reaction mixture was stirred under reflux for 12 hrs. and allowed to cool to room temperature. The reaction mixture was further cooled to +3° and decomposed by first adding 20 ml. of ethanol followed by 200 ml. of water. The reaction mixture was made acid to Congo red and the ether portion was discarded. Two kg. of ice was added to the aqueous portion and solid sodium hydroxide was added cautiously until the aluminum oxide had dissolved. The product was extracted from the alkaline mixture with ether. After the ether solution had dried over anhydrous sodium sulfate, the desiccant was filtered off and the residue, following the removal of the ether on a water bath, was distilled under reduced pressure; B.P. 125–127°/0.12 mm. The base was dissolved in ether and hydrogen chloride gas was passed into the solution to give (after filtration) the salt. Following recrystallization from a solution of ethyl acetate and methanol, a colorless solid was obtained; M.P. 258–259°. Vapor phase chromatography indicated a trans-cis ratio of 90:10.

Analysis.—Calc'd for $C_{15}H_{23}ClN_2 \cdot 2HCl$ (M.W. 339.5) (percent): C, 53.10; H, 7.37; N, 8.26. Found (percent): C, 53.45; H, 7.34; N, 8.51.

EXAMPLE 2

Alternate preparation of 4-(4-chlorophenethylamino)-1,3-dimethylpiperidine (cis-trans isomers) dihydrochloride via borane reduction To a stirred solution of 350 ml. of 1 M. borane in tetrahydrofuran was added a solution of 5 g. of 4-(4-chlorophenylacetamido) - 1,3 - dimethylpiperidine (trans isomer, M.P. 158–160°) in 50 ml. of tetrahydrofuran. During the addition, the temperature was held below 5° with an ice bath. After the addition, the reaction was slowly heated to reflux. The reaction mixture was refluxed and stirred for 3 hrs. With stirring, the reaction mixture was cooled to 0° in an ice bath and 100 ml. of 6 N hydrochrolic acid was added. Tetrahydrofuran was distilled from the mixture on a steam bath at atmospheric pressure over the course of 1 hr. The aqueous residue was cooled in an ice bath and solid potassium hydroxide was added carefully until the mixture was strongly alkaline. The alkaline mixture was extracted with ether (3× 100 ml.) and in turn the ether extract was washed with water (4× 50 ml.) and dried over anhydrous sodium sulfate. Following filtration of the desiccant, the solution was concentrated on a water bath. The residue was distilled under reduced pressure to give 4-(4-chlorophenethylamino)-1,3-dimethylpiperidine, B.P. 200–300°/11 mm.; $n_D^{25}=1.5245$, (T.L.C. trans isomer).

Preparation of 4-(4-chlorophenylacetamido)-1,3-dimethylpiperidine intermediate

To a stirred solution of 100 g. of 1,3-dimethylpiperidone-4 in 800 ml. of ethanol was added 60 g. of hydroxylamine hydrochloride. Toward the end of the addition, a heavy precipitate formed. After the addition was complete, the reaction mixture was refluxed and stirred for 4 hrs. and then permitted to cool to room temperature. The mixture was further cooled in an ice bath for 3 hrs. and filtered. The precipitate was then washed with cold alcohol (2× 50 ml.). After drying in a vacuum oven at 60° for 24 hrs., the oxime hydrochloride, M.P. 218–220° was obtained.

The oxime hydrochloride was dissolved in 300 ml. of water and a solution of 28 g. of sodium hydroxide in 150 ml. of water was added with stirring. The temperature was kept below 20° by the addition of ice. The alkaline mixture was extracted with ether (4× 200 ml.). In turn, the ether extract was washed by extraction with 100 ml. of water and dried over anhydrous sodium sulfate. Following removal of the desiccant by filtration, the solvent was evaporated. The residue was triturated with cold hexane (4× 50 ml.) and the crystalline solid that formed was filtered to give 1,3-dimethylpiperidone-4-oxime, M.P. 88–89°.

Analysis.—Calc'd for $C_7H_{14}N_2O$ (M.W. 142) (percent): C, 59.10; H, 9.87; N, 19.71. Found (percent): C, 58.91; H, 9.70; N, 19.80.

A mixture of 1 g. of 10 percent palladium on carbon, 10 ml. of water, 10 g. of 1,3-dimethyl-4-piperidone oxime and enough glacial acetic acid to bring the total volume up to 150 ml. was placed in a Parr hydrogenation apparatus. After 6 hrs. of shaking at 50° under an initial pressure of 3.7 atm. of hydrogen, the theoretical amount of hydrogen had been absorbed and the reduction was stopped. The catalyst was filtered from the mixture and the filtrate was concentrated under reduced pressure on a water bath. The residue was dissolved in 100 ml. of water and 50 g. of ice was added. The pH of the mixture was made greater than 10 with 50 percent sodium hydroxide, and the alkaline solution was extracted with chloroform (4× 100 ml.). After the extract had dried over anhydrous sodium sulfate, the desiccant was filtered off and the solvent was evaporated on a water bath at atmospheric pressure. The residue was distilled under reduced pressure to give 4-amino-1,3-dimethylpiperidine (cis-trans isomers), B.P. 81–82°/27 mm. A portion of the base was converted to the acetamide derivative with acetic anhydride and chloroform and recrystallized from Skellysolve "B," M.P. 148–149°.

*Analysis.*—Calc'd for $C_9H_{18}N_2O$ (M.W. 170) (percent): C, 63.52; H, 10.60; N, 16.46. Found (percent): C, 63.77; H, 10.94; N, 16.35.

The 4-amino-1,3-dimethylpiperidine so prepared was a mixture of 80 percent trans/20 percent cis isomers (V.P.C. analyses). Na/liq. $NH_3$/MeOH reduction gave the trans amine as the only product. The trans designation was supported by N.M.R. analysis of the acetamide derivative.

4 - (4 - chlorophenylacetamido)-1,3-dimethylpiperidine (trans isomer)

4 g. of 4-amino-1,3-dimethylpiperidine (80 percent trans) was reacted with 6 g. of p-chlorophenylacetylchloride to give 6 g. of amide. Following two recrystallizations from ethyl acetate, the melting point became 157–159°.

EXAMPLE 3

Preparation of 4 - (4 - chlorophenethylamino) - 1,3-dimethylpiperidine (cis-trans isomers) dihydrochloride via Schiffs' Base process A solution of 9 g. of p-chlorophenethylamine, 8 g. of 1,3-dimethylpiperidone-4 and 150 ml. of benzene was refluxed for 12 hrs. During this time, 0.8 ml. of water was removed from the reaction mixture by means of a Dean-Stark trap. The benzene was evaporated from the reaction mixture on a water bath under reduced pressure. The residue was distilled to give the Schiffs' base, B.P. 210–211°/20 mm., $n_D^{24}=1.5400$. The freshly distilled Schiffs' base was placed in a Parr hydrogenation apparatus. Platinum oxide (0.3 g.) and enough methanol to bring the total volume up to 180 ml. were added. After 3 hrs. of shaking at room temperature under an initial pressure of 3.7 atm. of hydrogen, the reduction was stopped. Following removal of the catalyst by filtration, the filtrate was concentrated and the residue was distilled under reduced pressure, B.P. 211–213°/22 mm., $n_D^{25}=1.5312$. An excess of alcoholic hydrogen chloride was added and the resulting solution was concentrated to dryness yielding the salt, M.P. 240–242°. Upon recrystallization from a solution of ethyl acetate and methanol, the melting point became 244–246°. Vapor phase chromatography indicated a cis-trans ratio of 80:20.

*Analysis.*—Calc'd for $C_{15}H_{23}ClN_2 \cdot 2HCl$ (M.W. 339.5) (percent): C, 53.10; H, 7.37; N, 8.26. Found (percent): C, 53.37; H, 7.25; N, 8.04.

EXAMPLE 4

An alternate preparation of 4-(4-chlorophenethylamino)-1,3-dimethylpiperidine via condensation with aralkyl halide A solution of 3 g. of β-(p-chlorophenethyl)bromide and 7 g. of 4-amino-1,3-dimethylpiperidine was stirred at 100° for 6 hrs. After the reaction had cooled to room temperature, it was partitioned between 200 ml. of 0.5 N sodium hydroxide and 300 ml. of ether. The ether solution was separated and extracted with 1 N hydrochloric acid (3× 50 ml.). The acid extract was cooled with ice and 6 N NaOH was added until the pH was greater than 10. The alkaline mixture was extracted with ether (3× 100 ml.) and in turn the ether extract was washed with water (3× 50 ml.) and dried over anhydrous sodium sulfate. Following the removal of the desiccant by filtration, the filtrate was concentrated under reduced pressure and the residue was distilled under reduced pressure to give 4 - (4-chlorophenethylamino)-1,3-dimethylpiperidine (cis-trans isomers), B.P. 195–201°/15 mm.; $n_D^{25}=1.5315$.

By analogous procedure starting with pure trans 4-amino-1,3-dimethylpiperidine, obtained by a stereoselective reduction of the oxime of 1,3-dimethylpiperidone-4, there was obtained pure trans 4 - (4 - chlorophenethylamino)-1,3-dimethylpiperidine.

EXAMPLE 5

An alternate preparation of 4-(4-chlorophenethylamino)-1,3-dimethylpiperidine (cis-trans isomers) dihydrochloride via condensation with aldehyde A solution of 5.1 g. of 4-amino-1,3-dimethylpiperidine (80 trans-20-cis), 6.2 g. of p-chlorophenylacetaldehyde and 50 ml. of benzene was refluxed for 16 hrs. During this time, 0.35 ml. of water was removed from the reaction mixture by the use of a Dean-Stark water trap. The solvent was evaporated from the reaction mixture under reduced pressure. The residue was dissolved in 50 ml. of ethanol and a solution of 2 g. of sodium borohydride in 40 ml. of ethanol was added over a period of 5 min. After the addition, the reaction was refluxed for 1 hr., and 50 ml. of cold water was added. The solution was saturated with sodium chloride and extracted with chloroform (3× 150 ml.). In turn, the chloroform extract was washed with water (1× 100 ml.), a saturated solution of sodium bisulfite (1× 100 ml.) and water (3× 100 ml.). After drying over anhydrous sodium sulfate, the desiccant was filtered off and the solution was concentrated under reduced pressure on a water bath to give 4-(4-chlorophenethylamino)-1,3-dimethylpiperidine; V.P.C. 80 percent trans.

EXAMPLE 6

Fractional crystallization of 4-(4-chlorophenethylamino)-1,3 dimethylpiperidine cis-trans isomer mixture 50 g. of a 4-(4-chlorophenethylamino)-1,3-dimethylpiperidine cis-trans mixture of base containing over 60 percent trans isomer was dissolved in 100 cc. of methanol and 31 cc. of 6 N HCl in methanol (slight excess) was added to make the solution acid to Congo; 300 cc. of ethanol was then added, the solution seeded, and set in the refrigerator for crystallization overnight. The crystalline product was collected on a Buchner funnel, washed with cold ethanol, and air dried. There was obtained the dihydrochloride melting at 255–260°. This product was recrystallized as follows:

45 g. of the dihydrochloride salt was dissolved in 7 vols. of warm (40°) methanol (315 cc.) and 3 vols. of ethanol (135 cc.) was added with stirring. The clear solution was seeded with pure trans 4-(4-chlorophenethylamino)-1,3-dimethylpiperidine dihydrochloride and set aside for crystallization at room temperature (26°) for 48 hrs. The crystalline product was collected and washed with cold alcohol and finally dried over $P_2O_5$ in vacuo at room temperature. There was obtained 4-(4-chloro-N-methylphenethylamino)-1,3-dimethylpiperidine (trans isomer) dihydrochloride melting at 273–275° (V.P.C. analysis indicated 97 percent trans isomer).

To further purify this product, 14.0 g. of this 97 percent trans mixture was dissolved in 7 vols. of MeOH (98 cc.) and 3 vols. of EtOH (42 cc.) was added to the solution and again set aside for crystallization at room temperature (26°) for 48 hrs.; pure trans product melting at 275–278° was obtained. The salt is homogeneous and all trans according to V.P.C. and T.L.C. analyses.

EXAMPLE 7

Methylation of trans 4 - (4 - chlorophenethylamino)-1,3-dimethylpiperidine dihydrochloride Into a 500 ml. round-bottomed flask, fitted with a reflux condenser, was placed 50 g. of trans 4-(4-chlorophenethylamino)-1,3-dimethylpiperidine dihydrochloride, 100 g. of 98–100 percent formic acid and 50 g. of 37 percent aqueous formaldehyde. The solution was refluxed for 9.5 hours and concentrated to dryness under vacuum on a water bath. The residue was dissolved in 500 ml. of water and 200 g. of ice was added and the pH made greater than 10 by adding 6 N sodium hydroxide to the mixture with stirring. The alkaline suspension was then extracted with ether (3× 300 ml.) and in turn the combined ether extracts were washed by extraction with water (4× 100 ml.). After the ether solution had dried over anhydrous sodium sulfate, the desiccant was filtered off and the ether was removed from the solution on a water bath. The residue was dissolved in 100 ml. of ethanol, cooled in an ice bath and 6 N hydrogen chloride in alcohol was added with stirring, until the solution was acid to Congo red. The solution was concentrated to dryness under reduced pressure on a water bath. The residue was recrystallized by dissolving it in a boiling solution of 50 ml. of methanol and 5.5 ml. of distilled water. After the solution was filtered, 690 ml. of warm acetone was added slowly with stirring. The warm solution was mixed thoroughly and allowed to cool to room temperature. After seeding, the solution was stored in a refrigerator for 48 hrs. The precipitate was filtered and washed with acetone (2× 50 ml.). After air drying, 4-(4-chloro-N-methylphenethylamino)-1,3-dimethylpiperidine dihydrochloride, M.P. 104–105° was obtained. This salt analyzed for a dihydrate:

Analysis.—Calc'd for $C_{16}H_{25}ClN_2 \cdot 2HCl \cdot 2H_2O$ (percent): C, 49.30; H, 7.96; N, 7.18. Found (percent): C, 49.49; H, 8.28; N, 7.12.

In order to remove the water of crystallization, 40 g. of the salt was dried under high vacuum over $P_2O_5$ at 60° to give anhydrous product: M.P. 157–159°. The product is pure trans (V.P.C., T.L.C. and N.M.R. analyses).

Analysis.—Calc'd for $C_{16}H_{25}ClN_2 \cdot 2HCl$ (percent): C, 54.35; H, 7.65; N, 7.94. Found (percent): C, 54.43; H, 7.98; N, 8.07.

EXAMPLE 8

Preparation of 4 - (4-chloro-N-methylphenethylamino)-1,3-dimethylpiperidine (cis-trans isomers) dihydrochloride In a 250 ml. three-necked, round-bottomed flask, fitted with a reflux condenser, stirrer and dropping funnel, was placed 30 g. of 4-(4-chlorophenethylamino)-1,3-dimethylpiperidine (90 percent trans isomer) and with stirring, 30 g. of 37 percent aqueous formaldehyde was added. There was a slight temperature rise. With the temperature held below 35° by intermittent cooling with an ice bath, and with stirring, 60 g. of cold 98–100 percent formic acid was added carefully. The mixture was then heated with stirring to reflux. After refluxing for 6 hrs., the solution was poured onto 500 g. of ice and with stirring, the pH was made greater than 10 with 6 N sodium hydroxide. The product that separated was extracted 3 times with 300 ml. of ether each time. The ether extracts were combined and washed with water (4× 100 ml.) and dried over anhydrous sodium sulfate. After the desiccant was filtered off, the ether was evaporated from the solution on a water bath. The residue was distilled under reduced pressure through a 6 inch Vigreux column and the fraction boiling between 210–218°/22 mm. was collected; $n_D^{25} = 1.5261$. The base was converted to the dihydrochloride with dry HCl gas in ether and the crude salt obtained was recrystallized from ethyl acetate and methanol; M.P. 234–235°.

Analysis.—Calc'd for $C_{16}H_{25}ClN_2 \cdot 2HCl$ (percent): C, 54.35; H, 7.65; N, 7.94. Found (percent): C, 54.13; H, 7.80; N, 7.75.

EXAMPLE 9

Preparation of 4-(4-chloro-N-methylphenethylamino)-1,3-dimethylpiperidine

A mixture of 5 g. of powdered anhydrous potassium carbonate, 30 ml. of acetone, 3 g. of 1,3-dimethyl-4-(methylamino)piperidine and 4 g. of 4-chlorophenethylbromide was stirred at reflux temperature for 6 hrs. The mixture was allowed to cool to room temperature and filtered. The filtrate was partitioned between 150 ml. of ether and 100 ml. of 1 N hydrochloric acid. The aqueous portion was separated, washed once by extraction with ether (100 ml.) and made strongly alkaline with 6 N sodium hydroxide. The alkaline mixture was extracted with ether (3× 100 ml.) and in turn the ether extract was washed with water (3× 50 ml.) and dried over anhydrous sodium sulfate. Following removal of the desiccant by filtration, the solution was concentrated to dryness and the residue was distilled under reduced pressure to give 0.4 g., B.P. 205–210°/21 mm.; V.P.C. 70 percent trans, 30 percent cis.

The 4-methylamino-1,3-dimethylpiperidine starting material was prepared by saturating a solution of 30 g. of 1,3-dimethylpiperidone-4, 60 ml. of benzene and 0.05 g. of p-toluenesulfonic acid monohydrate with dry monomethylamine gas and refluxing. While refluxing, a slow stream of anhydrous monomethylamine was bubbled into the solution. After 24 hours under reflux, 3.9 ml. of water was removed from the reaction mixture by means of a Dean-Stark trap. The benzene was distilled from the reaction mixture at atmospheric pressure and the residue was distilled under reduced pressure to give 1,3-dimethyl-4-(methylimino)piperidine, B.P. 77–79°/17 mm.; $n_D^{24} = 1.4750$.

A solution of 14 g. of 1,3-dimethyl-4-(methylimino)piperidine and 200 ml. of anhydrous alcohol was brought to reflux with stirring and 15 g. of sodium metal was added to the solution in small portions over the course of 15 min. After the addition of the sodium, the mixture was refluxed and stirred an additional ½ hour at which time all the sodium had reacted. The reaction mixture was cooled in an ice bath and 100 ml. of saturated aqueous sodium chloride was added. The mixture was extracted with ether (5×100 ml.) and the extract was dried over anhydrous potassium carbonate. Following removal of the desiccant by filtration, the filtrate was concentrated on a steam bath and the residue was distilled under reduced pressure to give 1,3-dimethyl-4-(methylamino)piperidine, B.P. 91–95°/43 mm.; $n_D^{24} = 1.4635$. V.P.C. analysis indicated a 70 percent trans: 30 percent cis mixture.

EXAMPLE 10

Preparation of 4-(4-chloro-N-methylphenethylamino)-1,3-dimethylpiperidine (cis isomer) dihydrochloride A solution of 17 g. of 4-(4-chlorophenethylamino)-1,3-dimethylpiperidine (75% cis), 17 g. of 37% aqueous formaldehyde and 34 g. of 97% formic acid was refluxed for 5.5 hrs. After the reaction mixture had cooled to room temperature, it was poured onto 200 g. of ice. The pH of the mixture was made greater than 10 with 6 N sodium hydroxide and the alkaline mixture was extracted with ether (3× 150 ml.). In turn, the ether extract was washed with water (3× 50 ml.) and dried over anhydrous sodium sulfate. Following removal of the desiccant, the filtrate was concentrated on a water bath and the residue was distilled under reduced pressure to give 4-(4-chloro-N - methylphenethylamino) - 1,3 - dimethylpiperidine, B.P. 193–195°/10 mm.; $n_D^{25} = 1.5300$; V.P.C. 75 percent cis-25 percent trans. The distillate was dissolved in 30 ml. of ethanol and an excess of 7 N alcoholic hydrogen chloride was added. The acidic solution was concentrated to dryness and the residue was crystallized from a mixture of 70 ml. of acetonitrile and 1 ml. of water to give the product as a crystalline salt (M.P. 232–237°). Upon two more recrystallizations from a solution of methanol and acetone, the salt was obtained having a melting point of 234–235°. V.P.C. of base ($n_D^{25} = 1.5325$) showed greater than 97 percent cis isomer. An additional recrystallization gave the pure cis isomer (M.P. 234–235°) according to V.P.C., T.L.C. and N.M.R.

EXAMPLE 11

Preparation of 4-(4-chloro-N-methylphenethylamino)-1-methylpiperidine dihydrochloride A solution of 10 g. of p-chlorophenethylamine, 150 ml. of dry benzene and 7 g. of 1-methylpiperidone-4 was refluxed for 5 hrs. During the reaction, 1.1 ml. of water was removed from reaction by means of a Dean-Stark water trap. The solution was concentrated to a syrup under reduced pressure on a water bath and the residue was distilled in vacuum to give the Schiff's base, B.P. 209–210°/20 mm. The freshly prepared Schiff's base (10 g.), 0.2 g. of platinum oxide and enough methanol to bring the total volume to 180 ml. was shaken in a Parr hydrogenation apparatus under 3.8 atm. of hydrogen. After 2 hrs. of shaking at room temperature, the theoretical amount of hydrogen had been taken up. The reaction was stopped and the catalyst was filtered off. A slight excess of alcoholic hydrogen chloride was added to the filtrate and it was concentrated on a steam bath to one-half volume. After cooling in an ice bath for several hours, the product that precipitated was filtered off and dried. A small portion was recrystallized from a mixture of ethyl acetate and methanol to give 4-(4-chlorophenethylamino)-1-methylpiperidine dihydrochloride, M.P. 297–298°.

*Analysis.*—Calc'd for $C_{14}H_{21}ClN_2.2HCl$ (M.W. 325.5) (percent): C, 51.60; H, 7.07; N, 8.61. Found (percent): C, 51.90; H, 6.70; N, 8.91.

The base (from the hydrochloride salt) boiled at 207–209°/18 mm. $n_D^{24}=1.5363$.

A mixture of 7 g. of 4-(4-chlorophenethylamino)-1-methylpiperidine, 14 g. of 98 percent formic acid and 7 g. of 37 percent aqueous formaldehyde was refluxed for 8 hrs. After the reaction mixture had remained overnight at room temperature, it was poured onto 200 g. of ice. Potassium carbonate was added to the mixture until the pH was greater than 9. An oily material separated and was collected by an ether extraction (3× 200 ml.). Following the washing of the ether extract with water (4× 50 ml.), the solution was dried over anhydrous sodium sulfate. After the desiccant was removed by filtration, the ether was evaporated off on a steam bath and the residue was distilled to give 4-(4-chloro-N-methylphenethylamino)-1-methylpiperidine, B.P. 216–217°/22 mm.; $n_D^{24}=1.5325$. The base was dissolved in ether and an excess of an alcoholic solution of hydrogen chloride was added. Following crystallization of the precipitate from a mixture of ethyl acetate and methanol, the salt having a melting point of 264–265° was obtained.

*Analysis.*—Calc'd for $C_{15}H_{23}ClN_2.2HCl$ (M.W. 339.5) (percent): C, 53.10; H, 7.37; N, 8.25. Found (percent): C, 53.34; H, 7.56; N, 8.45.

EXAMPLE 12

Preparation of 1-benzyl-4-(4-chloro-N-methylphenethylamino) piperidine dihydrochloride A solution of 32 g. of p-chlorophenethylamine, 250 ml. of dry toluene and 38 g. of 1-benzylpiperidone-4 was refluxed for 6 hrs. During this time, 3 ml. of water was removed from the reaction mixture by means of a Dean-Stark water trap. The solvent was evaporated from the reaction mixture and the residue was placed in a Parr hydrogenation apparatus. 0.3 g. of platinum oxide and enough methanol to bring the total volume to 180 ml. were added. The initial pressure was 3.7 atm. After 6 hrs. of shaking at room temperature, slightly less than the theoretical amount of hydrogen had been absorbed. The reaction was stopped. The catalyst was filtered off and the filtrate was concentrated on a water bath under vacuum. Upon distillation of the residue, a viscous oil was obtained, B.P. 205–207°/0.7 mm. The distillate was dissolved in ethanol and an excess of alcoholic hydrogen chloride was added. The precipitate obtained was crystallized from aqueous alcohol to give the 1-benzyl-4-(4-chlorophenethylamino)piperidine dihydrochloride product; M.P. 313–315°.

*Analysis.*—Calc'd for $C_{20}H_{25}ClN_2.2HCl$ (M.W. 401.5) (percent): C, 65.50; H, 7.64; N, 6.96. Found (percent): C, 65.82; H, 7.70; N, 7.04.

To a mixture of 28 g. of 1-benzyl-4-(4-chlorophenethylamino)piperidine and 30 g. of 37 percent aqueous formaldehyde, 60 g. of 98 percent formic acid was added with cooling. The resulting solution was refluxed for 4 hrs. After cooling to room temperature, the reaction mixture was poured onto 300 g. of ice. The pH was made greater than 9 with 6 N sodium hydroxide and the basic material was extracted with ether (3× 200 ml.). The ether extract was in turn extracted several times with water (3× 50 ml.) and dried over anhydrous sodium sulfate. Following the removal of the desiccant, the solvent was evaporated off and the residue was distilled to give 1-benzyl-4-(4-chloro - N - methylphenethylamino)-piperidine; B.P. 195–200°/0.3 mm. The distillate was dissolved in ethanol and an excess of alcoholic hydrogen chloride was added. In order to induce crystallization, acetone was added until the solution was turbid. The precipitate was filtered to give the hydrochloride salt, M.P. 276–277°. A small portion of the hydrochloride was recrystallized twice from a mixture of ethanol, water and acetone, M.P. 278–279°.

*Analysis.*—Calc'd for $C_{21}H_{27}ClN_2.2HCl$ (M.W. 415.5) (percent): C, 60.65; H, 6.98; N, 6.74. Found (percent): C, 61.03; H, 6.85; N, 6.75.

EXAMPLE 13

Preparation of 4-(4-chloro-N,α-dimethylphenethylamino)-1-methyl piperidine dihydrochloride A solution of 6 g. of 2-amino-1-(p-chlorophenyl)propane, 100 ml. of dry benzene and 5 g. of 1-methyl-4-piperidone was refluxed for 5 hrs. During this time, 0.8 ml. of water was removed from the reaction by means of a Dean-Stark water trap. The solvent was stripped from the reaction mixture under reduced pressure and the residue was placed in a Parr hydrogenation apparatus. 0.2 g. of platinum oxide and enough methanol to bring the total volume to 180 ml. were added. The initial pressure of hydrogen was 3.7 atm. After 6 hrs. of shaking at room temperature, slightly less than the theoretical amount of hydrogen had been absorbed. The reaction was stopped. The catalyst was filtered off and the filtrate was concentrated on a water bath under vacuum. Upon distillation, there was obtained 4 - (4 - chloro-α-methylphenethylamino) - 1 - methylpiperidine, B.P. 193–200°/16 mm.; $n_D^{24}=1.5383$. The distillate was dissolved in ether and an excess of alcoholic hydrogen chloride was added. Upon recrystallization from a solution of methanol and ethyl acetate, the salt melting at 290–292° was obtained.

*Analysis.*—Calc'd for $C_{15}H_{23}ClN_2.2HCl$ (M.W. 339.5) (percent): C, 53.00; H, 7.37. Found (percent): C, 53.03; H, 7.56.

A solution of 25 g. of 4-(4-chloro-α-methylphenethylamino)-1-methylpiperidine, 50 g. of 97 percent formic acid (added with cooling) and 25 g. of 37 percent aqueous formaldehyde was heated on a steam bath for 8 hrs. After remaining overnight at room temperature, the reaction mixture was poured onto 300 g. of ice. The pH was made greater than 9 with 6 N sodium hydroxide, and the basic material extracted with ether (4× 150 ml.). The ether extract was in turn extracted several times with water (3× 50 ml.) and dried over anhydrous sodium sulfate. Following the removal of the desiccant, the solvent was evaporated and the residue distilled to give 4-(4 - chloro-N,α-dimethylphenethylamino) - 1 - methyl-piperidine, B.P. 198–200°/10 mm.; $n_D^{24}=1.5320$. The distillate was dissolved in ether and an excess of alcoholic hydrogen chloride was added. Upon crystallization from a mixture of methanol and ethyl acetate, the salt was obtained, M.P. 261–262°.

*Analysis.*—Calc'd for $C_{16}H_{25}ClN_2 \cdot 2HCl$ (M.W. 353.5) (percent): C, 54.40; H, 7.65; N, 7.93. Found (percent): C, 54.65; H, 7.55; N, 7.78.

EXAMPLE 14

Preparation of 4 - (4 - chloro - N - methylbenzylamino)-1-methylpiperidine dihydrochloride A solution of 8.7 g. of p-chlorobenzylamine, 50 ml. of dry benzene and 7 g. of 1-methyl-4-piperidone was refluxed for 5 hrs. During this time, 1.1 ml. of water was removed by means of a Dean-Stark water trap. The solvent was stripped from the reaction mixture under reduced pressure and the residue was placed in a Parr hydrogenation apparatus. 0.2 g. of platinum oxide and enough methanol to bring the total volume to 180 ml. were added. The initial pressure was 3.7 atm. After 1.5 hours of shaking at room temperature, the theoretical amount of hydrogen had been absorbed and the reaction stopped. The catalyst was filtered off and the filtrate was concentrated under vacuum to a syrupy residue. To the residue, 10 g. of 37 percent aqueous formaldehyde and 20 g. of 97 percent formic acid were added (with cooling). After the solution had refluxed for 5 hours, the reaction mixture was poured onto 100 g. of ice. The pH was made greater than 9 with 6 N sodium hydroxide and the alkaline mixture was extracted with ether (2 × 200 ml.). In turn, the ether extract was extracted several times with water (3× 50 ml.) and dried over anhydrous sodium sulfate. Following the removal of the desiccant, the solvent was evaporated off and the residue was distilled to give 4 - (4 - chloro - N - methylbenzylamino) - 1-methylpiperidine, B.P. 174–177°/9 mm., M.P. ~35°. The distillate was dissolved in ether and an excess of alcoholic hydrogen chloride was added. Upon recrystallization from a solution of ethyl acetate and methanol, the salt having a melting point of 262–263° was obtained.

*Analysis.*—Calc'd for $C_{14}H_{21}ClN_2 \cdot 2HCl$ (M.W. 325.5) (percent): C, 51.70; H, 7.07; N, 8.61. Found (percent): C, 52.13; H, 7.44; N, 8.53.

EXAMPLE 15

Preparation of 1 - methyl - 4 - (N - methylphenethylamino)piperidine dihydrochloride A mixture of 15 g. of the Schiff's base obtained from the condensation of phenethylamine and 1-methylpiperidone-4, 0.2 g. of platinum oxide and enough methanol to bring the total volume to 180 ml. was shaken in a Parr hydrogenation apparatus under 3.9 atm. of hydrogen. After 3 hrs., the theoretical amount of hydrogen had been absorbed. The catalyst was filtered off and the solvent removed under reduced pressure. The residue was distilled in vacua to give 1-methyl-4-(β-phenethylamino)piperidine, B.P. 180–193°/30 mm..; $n_D^{24} = 1.5252$. The base obtained was dissolved in ether and excess alcoholic hydrogen chloride was added. The precipitate was crystallized with a solution of methanol and ethyl acetate to give the salt melting at 285–286°.

*Analysis.*—Calc'd for $C_{14}H_{22}N_2 \cdot 2HCl$ (M.W. 291) (percent): C, 57.75; H, 8.25; N, 9.36. Found (percent): C, 57.36; H, 8.22; N, 9.73.

A solution of 12.5 g. of 1-methyl-4-(β-phenethylamino)-piperidine, 25 g. of 97 percent formic acid (added with cooling) and 13 g. of 37 percent aqueous formaldehyde was heated on a steam bath for 7 hrs. After remaining overnight at room temperature, the reaction mixture was poured onto 200 g. of ice. The pH was made greater than 9 with 6 N sodium hydroxide and the basic material extracted with ether. The ether extracted was in turn extracted several times with water (4× 50 ml.) and dried over anhydrous sodium sulfate. Following the removal of the desiccant, the solvent was evaporated off and the residue was distilled to give 1-methyl-4-(N-methylphenethylamino)piperidine, B.P. 180–182°/16 mm.; $n_D^{24} = 1.5213$. The distillate was dissolved in ether and an excess of alcoholic hydrogen chloride was added. Upon crystallization from a solution of methanol and ethyl acetate, the salt having a melting point of 275–276° was obtained.

*Analysis.*—Calc'd for $C_{15}H_{24}N_2 \cdot 2HCl$ (M.W. 305) (percent): C, 59.00; H, 8.54; N, 9.18. Found (percent): C, 59.18; H, 8.34; N, 9.50.

EXAMPLE 16

Preparation of 1 - benzyl - 4 - (N - methylphenethylamino)piperidine dihydrochloride A solution of 18.9 g. of 1-benzyl-4-piperidone, 100 ml. of dry benzene and 13 g. of phenethylamine was refluxed for 4 hrs. During this time, 0.8 ml. of water was removed from the reaction mixture by means of a Dean-Stark water trap. The solvent was stripped from the reaction mixture under reduced pressure and the residue was placed in a Parr hydrogenation apparatus. 0.2 g. of platinum oxide and enough methanol to bring the total volume to 180 ml. were added. The initial pressure was 3.7 atm. After 4 hrs. of shaking at room temperature, slightly less than the theoretical amount of hydrogen had been absorbed, and the reaction was stopped. The catalyst was filtered off and the filtrate was concentrated on a water bath under vacuum to give a syrupy residue. 5 g. of the residue was dissolved in ether and an excess of alcoholic hydrogen chloride was added. The precipitate was crystallized from a solution of methanol and ethyl acetate to give 1-benzyl-4-(phenethylamino)piperidine dihydrochloride, M.P. 304–305°.

*Analysis.*—Calc'd for $C_{20}H_{26}N_2 \cdot 2HCl$ (M.W. 367) (percent): C, 65.50; H, 7.64; N, 7.64. Found (percent): C, 65.82; H, 7.71; N, 7.46.

A solution of 5 g. of 1-benzyl-4-(phenethylamino) piperidine, 10 g. of 97 percent formic acid and 5 g. of 37 percent aqueous formaldehyde was refluxed for 4 hrs. After standing overnight at room temperature, the reaction mixture was poured onto 300 g. of ice. The pH was made greater than 9 by the cautious addition of solid sodium hydroxide and the mixture was extracted with ether (2× 200 ml.). The extract was in turn washed several times with water (4× 50 ml.) and dried over anhydrous sodium sulfate. Following the removal of the desiccant, an excess of alcoholic hydrogen chloride was added. The gummy, amorphous precipitate that formed was crystallized from a mixture of methanol and ethyl acetate to give 1-benzyl-4-(N-methylphenethylamino) piperidine dihydrochloride, M.P. 284–285°.

*Analysis.*—Calc'd for $C_{21}H_{28}N_2 \cdot 2HCl$ (M.W. 381) (percent): C, 66.20; H, 7.88; N, 7.35. Found (percent): C, 66.39; H, 7.58; N, 7.10.

EXAMPLE 17

Preparation of 4-(α,N-dimethylphenethylamino)-1-methylpiperidine dihydrochloride A solution of 14 g. of α-methylphenethylamine, 150 ml. of dry benzene, and 12 g. of 1-methyl-4-piperidone was refluxed for 4 hrs. During this time, 1.5 ml. of water was removed by means of a Dean-Stark water trap. The benzene was removed from the solution under reduced pressure on a water bath and the residue (24 g.) was placed in a Parr hydrogenation apparataus. 0.2 g. of platinum oxide and enough methanol to bring the volume to 180 ml. were added. The initial pressure of hydrogen was 3.7 atm. After 3 hrs. of shaking at room temperature, slightly more than the theoretical amount of hydrogen had been absorbed and the reaction was stopped. The catalyst was filtered off and the filtrate was concentrated on a water bath under vacuum. Upon distillation, there was obtained 4-(α - methylphenethylamino) - 1 - methylpiperidine, B.P. 166–167°/12 mm.; $n_D^{24} = 1.5175$. The distillate was dissolved in ether and an excess of alcoholic hydrogen chloride was added. The hydrochloride obtained melted at 282–284° after crystallization from a solution of ethyl acetate and methanol.

*Analysis.*—Calc'd for $C_{15}H_{24}N_2.2HCl$ (M.W. 305) (percent): C, 59.00; H, 8.54; N, 9.18. Found (percent): C, 59.22; H, 8.69; N, 9.06.

A solution of 18 g. of 4-(α-methylphenethylamino)-1-methylpiperidine, 36 g. of 97 percent formic acid (added with cooling) and 18 g. of 37 percent aqueous formaldehyde was refluxed for 7 hrs. Upon cooling, the reaction mixture was poured onto 200 g. of ice and an excess of 6 N sodium hydroxide was added. The mixture was extracted with ether (2× 150 ml.). After several washings with water (3× 60 ml.), the ether extracted was dried over anhydrous sodium sulfate. Following the removal of the desiccant, the solution was concentrated under reduced pressure and the residue was distilled to give 4-(α,N - dimethylphenethylamino) - 1 - methylpiperidine, B.P. 179–180°/12 mm. $n_D^{24}=1.5203$. The distillate was dissolved in ether and a slight excess of alcoholic hydrogen chloride was added. Upon recrystallization of the precipitate from a solution of ethyl acetate and methanol, the product was obtained as the dihydrochloride salt.

EXAMPLE 18

Preparation of 4-(4-methoxy-N-methylphenethylamino)-1-methylpiperidine dihydrochloride A solution of 30 g. of p-methoxyphenethylamine, 200 ml. of dry toluene and 22 g. of 1-methylpiperidone-4 was refluxed for 7 hrs. During this time, 3 ml. of water was removed from the reaction mixture by means of a Dean-Stark water trap. The toluene was stripped from the reaction mixture and part of the residue (15 g.) was placed in a Paar hydrogenation apparatus. 0.2 g. of platinum oxide was added and the volume was brought up to 180 ml. with methanol. After shaking for 4 hrs. under an initial pressure of 3.7 atm., the theoretical amount of hydrogen had been absorbed. The catalyst was filtered off and the solvent was removed under vacuum. Upon distillation of the residue under reduced pressure, there was obtained 4-(4-methoxyphenethylamino)-1 - methylpiperidine, B.P. 210–213°/16 mm.; $n_D^{24}=1.5290$. The distillate was refluxed for 7 hrs. with 20 g. of 97 percent formic acid and 10 g. of 37 percent aqueous formaldehyde. Two hundred grams of ice was added to the reaction mixture and the pH was made greater than 9 by the addition of 6 N sodium hydroxide. The product was extracted from the alkaline mixture with ether and the ether extract was washed with water (4× 50 ml.) until neutral. After the ether solution had dried over anhydrous sodium sulfate, the desiccant was filtered off and the ether was removed on a water bath. Upon distillation of the residue, there was obtained 4-(4-methoxy-N-methylphenethylamino)-1-methylpiperidine, B.P. 208–213°/15 mm.; $n_D^{24}=1.5260$. The distillate was dissolved in ether and a slight excess of an alcoholic solution of hydrogen chloride was added. Following filtration, the precipitate was crystallized from a solution of ethyl acetate and methanol to give the salt melting at 260–261°.

*Analysis.*—Cal'd for $C_{16}H_{26}N_2O.2HCl$ (M.W. 335) (percent): C, 57.30; H, 8.36; N, 8.36. Found (percent): C, 57.40; H, 8.47; N, 8.55.

EXAMPLE 19

Preparation of 1-methyl-4-[β-(p-methylphenyl)-α-methyl-ethylamino]piperidine dihydrochloride A solution of 14 g. of β-(p-tolyl)ethylamine, 150 ml. of dry benzene and 12 g. of 1-methylpiperidone-4 was refluxed for 2 hrs. During this time, 2 ml. of water was removed by means of a Dean-Stark water trap. The solvent was stripped from the reaction mixture under reduced pressure and the residue was placed in a Parr hydrogenation apparatus. 0.2 g. of platinum oxide and enough methanol to bring the total volume to 181 ml. were added. After 3 hrs. of shaking at room temperature, the theoretical amount of hydrogen had been absorbed and the reaction was stopped. The catalyst was filtered off and the filtrate was concentrated under reduced pressure to give a syrupy residue. To the residue, 20 g. of 37 percent aqueous formaldehyde and 40 g. of 97 percent formic acid were added (with cooling). After the solution had refluxed for 5 hrs., the reaction mixture was poured onto 200 g. of ice. The pH was made greater than 9 with 6 N sodium hydroxide and the alkaline mixture was extracted with ether (3× 200 ml.). The ether extract was in turn extracted several times with water (3× 50 ml.) and then dried over anhydrous sodium sulfate. Following the removal of the desiccant, the solvent was evaporated off and the residue was distilled to give 1-methyl-4-[β-(p-methylphenyl) - α - methyl-ethylamino]-piperidine, B.P. 185–190°/17 mm.; $n_D^{24}=1.5201$. The distillate was dissolved in 300 ml. of ether and an excess of alcoholic hydrogen chloride was added. The product was obtained as the hydrochloride which, on recrystallization from ethanol and acetone, melted at 273–274°.

*Analysis.*—Calc'd for $C_{16}H_{26}N_2.2HCl$ (M.W. 319) (percent): C, 60.20; H, 8.78; N, 8.78. Found (percent): C, 60.44; H, 8.96; N, 8.80.

EXAMPLE 20

Preparation of 4-(chloro-N - methylphenethylamino) - 1-phenethylpiperidine dihydrochloride A solution of 10.2 g. of 1-(β-phenethyl)piperidone-4, 8 g. of β-(p-chlorophenethyl)-amine and 100 ml. of toluene was refluxed for 7 hrs. During this time, 0.8 ml. of water was removed from the reaction mixture by means of a Dean-Stark water trap. The solvent was stripped from the reaction mixture under reduced pressure and the residue was placed in a Parr hydrogenation apparatus. 0.2 g. of platinum oxide and enough methanol to bring the total volume to 180 ml. were added. After shaking for 5 hrs. at room temperature under 3.7 atm. of hydrogen, the theoretical amount of hydrogen had been absorbed. The catalyst was filtered from the mixture and the filtrate was concentrated under reduced pressure to give 18 g. of residue. To the residue, 18 g. of 37 percent aqueous formaldehyde and 40 g. of 98–100 percent formic acid were added (with cooling). After the solution had refluxed for 5 hrs., the reaction mixture was poured onto 200 g. of ice. The pH was made greater than 10 by adding 6 N sodium hydroxide and the alkaline mixture was extracted with ether (3× 200 ml.). The ether solution was in turn extracted with water (4× 50 ml.) and dried over anhydrous sodium sulfate. Following the removal of the desiccant, the solvent was evaporated off and the residue was distilled under reduced pressure to give 4-(chloro-N-methylphenethylamino)-1-phenethylpiperidine, B.P. 200–208° at 0.3 mm.; $n_D^{25}=1.5602$. The distillate was dissolved in 400 ml. of ether and an excess of alcoholic hydrogen chloride was added. The hydrochloride was obtained which upon recrystallization from a solution of ethyl acetate and methanol melted at 295–297°.

*Analysis.*—Calc'd for $C_{22}H_{29}ClN_2.2HCl$ (M.W. 429.5) (percent): C, 61.50; H, 7.23; N, 6.54. Found (percent): C, 61.53; H, 7.24; N, 6.34.

EXAMPLE 21

Preparation of 1-methyl-4-(N-methyl-4-nitrophenethyl) piperidine dihydrochloride A solution of 10 g. of p-nitrophenethylamine, 10 g. of 1-methylpiperidone-4, 150 ml. of toluene and 0.3 g. of p-toluenesulfonic acid monohydrate was refluxed for 7 hrs. During this time, 1.4 ml. of water was removed by the use of a Dean-Stark water trap. The reaction mixture was concentrated to a syrup under reduced pressure on a water bath. 250 ml. of methanol was added to the residue (17.6 g.) and 4 g. of sodium borohydride was added in small portions with stirring over the course of 15 min. (temp. 23–48°). Following the addition, the reaction mixture was stirred for 1 hr. at room temperature. With continued stirring, 50 ml. of 3 N sodium hydroxide was added, followed by 100 ml. of a saturated solution of sodium chloride. The mixture was extracted with chloroform (3× 100 ml.) and the solution was dried over anhydrous potassium carbonate. Following removal of the desiccant, the solution was evaporated on a water bath under reduced pressure. With cooling, 17 g. of 37 percent aqueous formaldehyde and 34 g. of 98–100 percent formic acid were added to the residue. The solution was refluxed for 7 hrs., cooled to room temperature and poured onto 300 g. of ice. 6 N sodium hydroxide was then added until the pH of the mixture was greater than 10, and the mixture was extracted with chloroform (4× 100 ml.). In turn, the extract was washed by extraction with water (5× 50 ml.) and dried over anhydrous sodium sulfate. After the desiccant had been filtered from the solution, the solvent was removed under reduced pressure on a water bath. The residue was dissolved in 400 ml. of ether and an excess of 6 N hydrogen chloride in alcohol was added. There was obtained 1-methyl-4-(N-methyl - 4 - nitrophenethyl) - piperidine dihydrochloride, which upon recrystallization from a solution of methanol and ethyl acetate melted at 254–255°.

*Analysis.*—Calc'd for $C_{15}H_{23}N_3O_2 \cdot 2HCl$ (M.W. 350) (percent): C, 51.50; H, 7.15; N, 12.00. Found (percent): C, 51.31; H, 7.14; N, 11.74.

EXAMPLE 22

Preparation of 1-sec.butyl-4-(4-chloro-N-methylphenethylamino)-piperidine dihydrochloride A solution of 10 g. of 1-sec.butyl-4-piperidone, 10 g. of β-(p-chlorophenethyl)-amine and 75 ml. of toluene was refluxed for 8 hrs. During this time, 1.1 ml. of water was removed with a Dean-Stark water trap. The solvent was evaporated from the mixture under reduced pressure on a water bath and the residue was placed in a Parr hydrogenation apparatus. 0.2 g. of platinum oxide and enough methanol to bring the total volume to 180 ml. were added. After shaking for 4 hrs. at room temperature under 3.7 atm. of hydrogen, the uptake of hydrogen stopped. The catalyst was filtered from the mixture and the filtrate was concentrated to a syrup under reduced pressure. Vacuum distillation of the syrup gave a base boiling at 216–218°/13 mm.; $n_D^{24}=1.5285$. To the distillate was added 7 g. of 37 percent aqueous formaldehyde followed by 14 g. of 98–100 percent formic acid. After the solution had refluxed for 6 hrs., the reaction mixture was poured onto 200 g. of ice. The pH of the mixture was made greater than 10 by the addition of 6 N sodium hydroxide and the alkaline mixture was extracted with ether (3× 100 ml.). In turn, the ether extract was extracted with water (4× 50 ml.) and dried over anhydrous potassium carbonate. After the desiccant had been filtered off, the solvent was evaporated under reduced pressure and the residue was distilled to give 1-sec.butyl-4-(4-chloro-N-methylphenethylamino)piperidine as a light yellow oil, B.P. 222–226°/15 mm.; $n_D^{24}=1.5252$. The distillate was dissolved in 300 ml. of ether and a slight excess of 6 N alcoholic hydrogen chloride was added. The hydrochloride thus obtained upon recrystallization from a solution of ethyl acetate and methanol melted at 268–269°.

*Analysis.*—Calc'd for $C_{18}H_{29}ClN_2 \cdot 2HCl$ (M.W. 381.5) (percent): C, 56.60; H, 8.14; N, 7.35. Found (percent): C, 56.78; H, 8.18; N, 7.35.

EXAMPLE 23

Preparation of 3-n-butyl-4-(4-chloro-N-methylphenethylamino)-1-methylpiperidine (cis isomer) dihydrochloride A solution of 10 g. of 3-n-butyl-1-methylpiperidone-4, 11 g. of β-(p-chlorophenethyl)amine and 75 ml. of toluene was refluxed for 7 hrs. During this time, 1 ml. of water was removed from the reaction mixture by means of a Dean-Stark trap. The solvent was evaporated from the reaction mixture and the residue was placed in a Parr hydrogenation apparatus. 0.2 g. of platinum oxide and enough methanol to bring the total volume to 180 ml. were added. After shaking for 3 hrs. at room temperature under 3.7 atm. of hydrogen, the theoretical amount of hydrogen had been absorbed. The catalyst was filtered from the mixture and the filtrate was concentrated under reduced pressure. A solution of the residue in 20 g. of 37 percent aqueous formaldehyde and 40 g. of 90–100 percent formic acid was refluxed. After 6 hrs. under reflux, the reaction mixture was poured onto 300 g. of ice. The pH of the mixture was made greater than 10 by the addition of 6 N sodium hydroxide and the alkaline mixture was extracted with ether (4× 80 ml.) and dried over anhydrous potassium carbonate. Following removal of the desiccant, the solvent was evaporated off and the residue was distilled under reduced pressure to give 3-n-butyl-4-(4-chloro-N-methylphenethylamino) - 1 - methylpiperidine, B.P. 216–219°/11 mm.; $n_D^{23}=1.5230$. The distillate was dissolved in 400 ml. of ether and a slight excess of 6 N alcoholic hydrogen chloride was added to give the hydrochloride which, upon recrystallization from a solution of ethyl acetate and methanol, had a melting point of 263–264°.

*Analysis.*—Calc'd for $C_{19}H_{31}ClN_2 \cdot 2HCl$ (M.W. 395.5) (percent): C, 57.70; H, 8.34; N, 7.09. Found (percent): C, 57.84; H, 7.83; N, 7.15.

EXAMPLE 24

Preparation of 3-benzyl-4-(4-chloro-N-methylphenethylamino)-1-methylpiperidine (cis isomer) dihydrochloride A solution of 10 g. of 3-benzyl-1-methylpiperidone-4, 9 g. of β-(p-chlorophenethyl)-amine and 75 ml. of toluene was refluxed 6 hrs. During this time, 1 ml. of water was removed by the use of a Dean-Stark trap. The solvent was evaporated from the reaction mixture under reduced pressure and the residue was placed in a Parr hydrogenation apparatus. 0.2 g. of platinum oxide and enough methanol to bring the total volume to 180 ml. were added. After shaking for 2 hrs. at room temperature under 3.7 atm. of hydrogen, the theoretical amount of hydrogen had been absorbed and the reaction was stopped. The catalyst was filtered off and the filtrate was concentrated under reduced pressure. A solution of the residue in 15 g. of 37 percent aqueous formaldehyde and 30 g. of 98–100 percent formic acid was refluxed for 6 hrs. The reaction mixture was poured onto 300 g. of ice. The pH of the mixture was made greater than 10 by the addition of 6 N sodium hydroxide and the alkaline mixture was extracted with ether. The ether extract was in turn extracted with water (4× 50 ml.) and then dried over anhydrous potassium carbonate. After the desiccant had been filtered off, the solvent was evaporated and the residue was distilled under reduced pressure to give 3-benzyl - 4 - (4 - chloro - N - methylphenethylamino)-1-methylpiperidine, B.P. 255–257°/10 mm.; $n_D^{23}=1.5621$. The distillate was dissolved in 400 ml. of ether and a slight excess of 6 N alcoholic hydrogen chloride was added to give the hydrochloride which, upon recrystallization from a solution of ethyl acetate and methanol, melted at 266–267°. T.L.C. (one spot) and N.M.R. supported the cis isomer designation.

*Analysis.*—Calc'd for $C_{22}H_{29}ClN_2 \cdot 2HCl$ (M.W. 429.5) (percent): C, 61.60; H, 7.24; N, 6.53. Found (percent): C, 61.85; H, 7.33; N, 6.33.

EXAMPLE 25

Preparation of 4-(3,4-dichloro-N-methylphenethylamino)-1,3-dimethylpiperidine (cis isomer) dihydrochloride A solution of 9.7 g. of β-(3,4-dichlorophenethyl)amine, 7 g. of 1,3-dimethylpiperidone-4 and 75 ml. of toluene was refluxed for 6 hrs. During this time, 0.8 ml. of water was removed by means of a Dean-Stark trap. The reaction mixture was concentrated under reduced pressure and the residue was placed in a Parr hydrogenation apparatus. 0.2 g. of platinum oxide was added and the total volume was brought up to 180 ml. with methanol. After shaking for 2 hrs. at room temperature under 3.7 atm. of hydrogen, the theoretical amount of hydrogen had been taken up and the reaction was stopped. The catalyst was filtered from the mixture and the filtrate was concentrated under reduced pressure on a water bath. A solution of the residue in 14 g. of 37 percent aqueous formaldehyde and 30 g. of 98–100 percent formic acid was refluxed for 5 hrs. and then poured onto 300 g. of ice. The pH was made greater than 10 by adding 6 N sodium hydroxide. The alkaline mixture was extracted with ether (4× 100 ml.) and in turn the ether extract was extracted with water (4× 50 ml.) and then dried over anhydrous sodium sulfate. Following removal of the desiccant, the solvent was evaporated and the residue was distilled at reduced pressure to give 4-(3-dichloro-N-methylphenethylamino)-1,3-dimethylpiperidine, B.P. 215–218°/10 mm.; $n_D^{24}$= 1.5410. The distillate was dissolved in 400 ml. of ether and a slight excess of 6 N alcoholic hydrogen chloride was added to give the dihydrochloride which upon recrystallization from isopropanol melted at 249–250°. T.L.C. and N.M.R. support the cis isomer designation with a few percent (<3 percent) of the trans isomer present.

*Analysis.*—Calc'd for $C_{16}H_{24}Cl_2N_2 \cdot 2HCl$ (M.W. 388) (percent): C, 49.50; H, 6.70; N, 7.23. Found (percent): C, 49.37; H, 6.56; N, 7.36.

EXAMPLE 26

Preparation of 4-(4-bromo-N-methylphenethylamino)-1, 3-dimethylpiperidine (cis isomer) dihydrochloride A solution of 9 g. of β-(p-bromophenethyl)amine, 6.3 g. of 1,3-dimethylpiperidone-4 and 75 ml. of toluene was refluxed for 6 hrs. During this time, 0.6 ml. of water was removed by the use of a Dean-Stark water separator. The reaction mixture was evaporated under reduced pressure on a water bath and the residue was placed in a Parr hydrogenation apparatus; 0.2 g. of platinum oxide and enough methanol to bring the total volume up to 180 ml. were added. After shaking for 3 hrs. at room temperature under 3.7 atm. of hydrogen, the theoretical amount of hydrogen had been absorbed and the reduction was stopped. The catalyst was filtered from the mixture and the filtrate was concentrated to a syrup under reduced pressure. To the residue 10 g. of 37% aqueous formaldehyde and 20 g. of 98–100% formic acid were added (with cooling). After the solution had refluxed for 6 hrs., the reaction mixture was poured onto 200 g. of ice. The pH was made greater than 10 with 6 N sodium hydroxide and the alkaline mixture was extracted with ether (3× 100 ml.). In turn, the ether extract was washed by extraction with water (4× 50 ml.) and dried over anhydrous sodium sulfate. Following filtration of the desiccant, the solvent was evaporated and the residue was distilled under reduced pressure to give 4-(4-bromo-N-methylphenethylamino)-1,3-dimethylpiperidine, B.P. 201–213°/11 mm.; $n_D^{24}$=1.5457. The distillate was dissolved in 100 ml. of alcohol and a slight excess of alcoholic hydrogen chloride was added. The mixture was concentrated under reduced pressure on a water bath and the residue was crystallized from a solution of ethyl acetate and methanol to give the salt, M.P. 217–219°. T.L.C. and N.M.R. support cis isomer designation with less than 1% trans isomer present.

*Analysis.*—Calc'd for $C_{16}H_{25}BrN_2 \cdot 2HCl$ (M.W. 398) (percent): C, 48.25; H, 6.79; N, 7.04. Found (percent): C, 48.12; H, 7.13; N, 6.96.

EXAMPLE 27

Preparation of 4-(4-chloro-N-methylphenethylamino)-3-methyl-1-phenethylpiperidine (cis isomer) dihydrochloride A solution of 11.5 g. of 3-methyl-1-(β-phenethyl)piperidone-4, 10 g. of β-(p-chlorophenethyl)amine and 70 ml. of toluene was refluxed for 12 hrs. During this time, 0.8 ml. of water was removed from the reaction by means of a Dean-Stark trap. The reaction mixture was concentrated under reduced pressure on a water bath and the residue was placed in a Parr hydrogenation apparatus; 0.2 g. of platinum oxide and enough methanol to bring the total volume up to 180 ml. were added. After shaking for 7 hrs. at room temperature under 3.7 atm. of hydrogen, the theoretical amount of hydrogen had been absorbed and the reduction was stopped. The catalyst was filtered from the mixture and the filtrate was concentrated to a syrup under reduced pressure. To the residue, 10 g. of 37% aqueous formaldehyde and 20 g. of 98–100% formic acid were added (with cooling). After the solution had refluxed for 6 hrs., the reaction mixture was poured onto 300 g. of ice. The pH was made greater than 10 with 6 N sodium hydroxide and the alkaline mixture was extracted with ether (3× 100 ml.). In turn, the ether extract was washed by extraction with water (4× 50 ml.) and dried over anhydrous sodium sulfate. Following filtration of the desiccant, the solvent was evaporated and the residue was distilled under reduced pressure to give 4 - (4-chloro-N-methylphenethylamino) - 3 - methyl-1-phenethylpiperidine, B.P. 205–206°/0.3 mm. The distillate was dissolved in 400 ml. of ether and a slight excess of alcoholic hydrogen chloride was added to give the hydrochloride which upon recrystallization from methanol melted at 260–261°.

*Analysis.*—Calc'd for $C_{23}H_{31}ClN_2 \cdot 2HCl$ (M.W. 443.5) (percent): C, 62.30; H, 7.45; N, 6.32. Found (percent): C, 62.36; H, 7.68; N, 6.70.

T.L.C. and N.M.R. indicate that the isomer mixture is essentially cis. V.P.C. analysis indicates an 86:14 cis-trans mixture.

EXAMPLE 28

Preparation of 4-(4-trifluoromethyl-N-methylphenethylamino)-1,3-dimethylpiperidine (cis isomer) dihydrochloride A solution of 3 g. of β-(p-trifluoromethylphenethyl)-amine, 2.5 ml. of 1,3-dimethylpiperidone-4 and 40 ml. of toluene was refluxed for 10 hrs. During this time, 0.25 ml. of water was removed from the reaction by the use of a Dean-Stark trap. The reaction mixture was evaporated under reduced pressure on a water bath and the residue was placed in a Parr hydrogenation apparatus; 0.1 g. of platinum oxide and enough methanol to bring the total volume to 180 ml. were added. After shaking for 1 hr. at room temperature under 3.7 atm. of hydrogen, the theoretical amount of hydrogen had been absorbed and the reduction was stopped. The catalyst was filtered from the mixture and the filtrate was concentrated to a syrup under reduced pressure. To the residue, 3 g. of 37% formaldehyde and 6 g. of 98–100% formic acid were added. After the solution had refluxed for 5 hrs., 50 g. of ice was added to the mixture and the pH was made greater than 10 with 3 N sodium hydroxide. The alkaline mixture was extracted with ether (3× 50 ml.). In turn, the ether extract was washed by extraction with water (4× 30 ml.) and dried over anhydrous sodium sulfate. Following removal of the desiccant by filtration, the solvent was evaporated and the residue was distilled under reduced pressure to give 4-(4-trifluoromethyl-N-methylphenethylamino)-1,3-dimethylpiperidine, B.P. 171–174°/10 mm.; $n_D^{24}$=1.4845. The distillate was dissolved in 100 ml. of ethanol and an excess of 6 N alcoholic hydrogen chloride was added. Upon crystallization of the hygroscopic precipitate that formed from a solution of acetone and ether, the salt having a melting point of 234–235° was obtained. T.L.C. indicates a single isomer (cis).

*Analysis.*—Calc'd for $C_{17}H_{25}F_3N_2 \cdot 2HCl$ (M.W. 387) (percent): C, 52.70; H, 6.98; N, 7.25. Found (percent): C, 53.05; H, 6.93; N, 6.72.

EXAMPLE 29

Preparation of 1,3-dimethyl-4-phenethylaminopiperidine (cis isomer)

A solution of 27 g. of 1,3-dimethylpiperidone-4, 24 g. of phenethylamine and 100 ml. of benzene was refluxed and stirred for 4 hrs. During this time, 3.1 ml. of water was removed from the reaction mixture by means of a Dean-Stark water trap. The solvent was stripped from the reaction mixture under reduced pressure and the residue was placed in a low pressure hydrogenation bottle. Platinum oxide (0.4 g.) and enough methanol to bring the total volume to 200 ml. were added and the bottle was placed in a Parr hydrogenation apparatus. After shaking under an atmosphere of hydrogen (initial pressure 58 lbs. per sq. in.) at room temperature for 1 hr., slightly more than the theoretical amount of hydrogen had reacted and the shaking was stopped. The catalyst was filtered from the solution and after removing the methanol from the filtrate on a water bath, the residue was distilled to give 1,3-dimethyl-4-phenethylaminopiperidine, B.P. 160–162°/6 mm.; $n_D^{25}$=1.5210. T.L.C. showed two substances and N.M.R. indicated a ratio of 10:1 of cis to trans isomers An excess of alcoholic hydrogen chloride was added to a solution of the base (15 g.) in methanol and the dihydrochloride was obtained by the addition of several volumes of ethyl acetate. Upon recrystallization from a mixture of ethyl acetate and methanol, the salt melted at 234–240°. T.L.C. analysis indicated that the salt was essentially the cis isomer.

*Analysis.*—Calc'd for $C_{15}H_{24}N_2 \cdot 2HCl$ (M.W. 305.2) (percent): C, 59.03; H, 8.59; N, 9.18. Found (percent): C, 58.90; H, 8.72; N, 9.07.

Upon methylation with formaldehyde and formic acid by a procedure analogous to that of Example 7 there is also prepared 4-(N-methylphenethylamino)-1,3-dimethylpiperidine.

EXAMPLE 30

Preparation of 1,3-dimethyl-4-(3-phenylpropylamino)-piperidine (cis-trans isomers) dihydrochloride 11 g. of aluminum chloride dissolved in 75 ml. of ether was added rapidly with stirring to a solution of 3 g. of lithium aluminum hydride in 50 ml. of ether. After the complex had stirred at room temperature for 30 min., 5.2 g. of 3-phenyl-N-(1,2,5,6-tetrahydro-1,3-dimethyl-4-pyridyl)propionamide suspended in 250 ml. of ether was added. Upon completion of the addition, the reaction mixture was stirred at reflux temperature for 12 hrs. and then allowed to cool to room temperature. By means of an ice bath the reaction mixture was further cooled to +3° and decomposed with cold water. The pH was made less than 1 with 6 N hydrochloric acid and the ether portion of the mixture was discarded. The aqueous portion was made strongly alkaline with concentrated sodium hydroxide. During the addition of sodium hydroxide, the temperature was maintained below 10° by the addition of ice. The product was isolated by extraction with ether. After the ether solution had dried over anhydrous sodium sulfate, the desiccant was filtered off and the solvent was removed on a water bath. The residue was distilled under reduced pressure to give 1,3-dimethyl-4-(3-phenylpropylamino)piperidine, B.P. 120–123°/0.05 mm.; $n_D^{25}$= 1.5160. Dry hydrogen chloride gas was bubbled through an ether solution of the base and the precipitate obtained was crystallized from a mixture of ethyl acetate and methanol to give the salt melting at 235–237°. T.L.C. and N.M.R. analysis indicated a 70:30 trans-cis ratio.

*Analysis.*—Calc'd for $C_{16}H_{26}N_2 \cdot 2HCl$ (M.W. 319) (percent): C, 60.20; H, 8.78. Found (percent): C, 60.72; H, 8.43.

Methylation with formaldehyde and formic acid in analogy to the process of Example 7 gives 4-(N-methyl-3-phenylpropylamino)-1,3-dimethylpiperidine.

EXAMPLE 31

Preparation of 4-(3,4-dimethoxyphenethylamino)-1-methylpiperidine dihydrochloride A solution of 36 g. of 3,4-dimethoxyphenethlylamine, 150 ml. of dry benzene and 23 g. of 1-methyl-4-piperidone was refluxed for 8 hrs. During this time, 3 ml. of water was removed from the reaction mixture by means of a Dean-Stark water trap. The solvent was stripped from the reaction mixture under reduced pressure and 30 g. of the residue was placed in a Parr hydrogenation apparatus; 0.3 g. of platinum oxide and enough methanol to bring the total volume to 180 ml. were added. The initial pressure was 3.7 atm. After 5 hrs. of shaking at room temperature, slightly less than the theoretical amount of hydrogen had been absorbed and the reaction was stopped. The catalyst was filtered off and the filtrate was concentrated on a water bath under vacuum. The residue was dissolved in ethanol and a slight excess of alcoholic hydrogen chloride was added. Following recrystallization from methanol the hydrochloride was obtained having a melting point of 282–283°.

*Analysis.*—Calc'd for $C_{16}H_{26}N_2O_2 \cdot 2HCl$ (M.W. 351) (percent): C, 54.70; H, 7.98; N, 7.98. Found (percent): C, 54.83; H, 7.78; N, 7.78.

Methylation with formaldehyde and formic acid in analogy to the process of Example 7 gives 4-(N-methyl-3,4-dimethoxyphenylamino)-1-methylpiperidine.

EXAMPLE 32

Preparation of 4-(3,4-dimethoxybenzylamino)-1,3-dimethylpiperidine (cis isomer)

A solution of 15 g. of 3,4-dimethoxybenzylamine, 15 g. of 1,3-dimethylpiperidone-4 and 70 ml. of benzene was refluxed and stirred for 5 hrs., and 1.3 ml. of water was removed from the reaction mixture by means of a Dean-Stark water trap. The solvent was stripped from the reaction mixture under reduced pressure and the residue was placed in a low pressure hydrogenation bottle. Platinum oxide (0.2 g.) and enough methanol to bring the total volume up to 180 ml. were added. The bottle was placed in a Parr hydrogenation apparatus. After shaking under an atmosphere of hydrogen (initial pressure 56 lbs. per sq. in.) at room temperature for 3 hrs., the theoretical amount of hydrogen had reacted and the shaking was stopped. The catalyst was filtered from the solution and the filtrate was concentrated under reduced pressure on a water bath. The residue was distilled to give 4-(3,4-dimethoxybenzylamino)-1,3-dimethylpiperidine, B.P. 203–205°/7 mm.; $n_D^{26}$=1.5350. T.L.C. clearly showed 2 substances, one much more prevalent than the other. N.M.R. showed one substance (cis isomer from lower field methyl split): 11 g. of the distillate was made into the dihydrochloride. Recrystallized from a mixture of ethyl acetate and methanol, the salt melted at 256–260°. T.L.C. still indicated two isomers with the cis isomer in great excess.

*Analysis.*—Calc'd for $C_{16}H_{26}N_2O_2 \cdot 2HCl$ (M.W. 351.3) (percent): C, 54.65; H, 7.98; N, 7.98. Found (percent): C, 54.30; H, 8.03; N, 7.45.

Methylation with formaldehyde and formic acid in analogy to the process of Example 7 gives 4-(N-methyl-3,4-dimethoxybenzylamino)-1,3-dimethylpiperidine.

EXAMPLE 33

Preparation of 4-(4-aminophenethylamino)-1,3-dimethylpiperidine (cis-trans isomers)

A solution of 5.8 g. of p-nitrophenethylamine, 7 g. of 1,3-dimethylpiperidone-4 and 50 ml. of benzene was refluxed and stirred for 5 hrs. During this time, 0.5 ml. of water was removed from the reaction mixture by means of a Dean-Stark water trap. The solvent was evaporated from the reaction mixture under reduced pressure and the residue was placed in a low pressure hydrogenation bottle. Platinum oxide (0.3 g.) and enough methanol to bring the total volume up to 180 ml. were added and the bottle was placed in a Parr hydrogenation apparatus. After shaking under an atmosphere of hydrogen (initial pressure was 58 lbs. per sq. in.) at room temperature for 5 hrs., slightly more than the theoretical amount of hydrogen had reacted and the shaking was stopped. The catalyst was filtered from the solution and after removing the methanol from the filtrate on a water bath, the residue was distilled to give 4-(4-aminophenethylamino) - 1,3-dimethylpiperidine, B.P. 205–207°/6 mm. N.M.R. indicated a ratio of 4:1 of cis to trans isomers. An excess of an ether solution of anhydrous oxalic acid was added to 6 g. of distillate dissolved in ether. Following filtration and recrystallization from methanol, the oxalate was obtained, M.P. 123–124°. T.L.C. still showed 2 isomers present in a 4:1 ratio.

*Analysis.*—Calc'd for $C_{15}H_{25}N_3 \cdot 2(C_2H_2O_4)$ (M.W. 427.5) (percent): C, 53.38; H, 6.84; N, 9.83. Found (percent): C, 53.31; H, 7.15; N, 10.14.

Methylation with formaldehyde and formic acid in analogy to the process of Example 7 gives 4-(N-methyl-4-aminophenethylamino) - 1,3 - dimethylpiperidine.

EXAMPLE 34

Preparation of 4-(4 - dimethylaminophenethylamino)-1,3-dimethylpiperidine (cis-trans isomers) trihydrobromide 11 g. of anhydrous aluminum chloride dissolved in 100 ml. of ether was added rapidly to a stirring solution of 3 g. of lithium aluminum hydride in 250 ml. of ether. After the mixture had stirred for 20 min. at room temperature, a suspension of 4 g. of 2-(4-dimethylaminophenyl)-N-(1,2,5,6 - tetrahydro - 1,3-dimethyl-4- pyridyl) acetamide in 200 ml. of ether was added to the stirring mixture. The reaction mixture was stirred under reflux for 5 hrs. and then allowed to cool at room temperature. It was further cooled with an ice bath, and 20 ml. of ethanol was added with stirring, followed by 100 ml. of water. The mixture was made acid to Congo red with cold 6 N hydrochloric acid and the organic portion was discarded. Solid sodium hydroxide was added slowly until the mixture was strongly alkaline. Ice was added to moderate the temperature during the neutralization. The alkaline mixture was extracted 3 times with 300 ml. of ether each time. After the combined ether solution had dried over anhydrous sodium sulfate, the desiccant was filtered off and a slight excess of an ethanolic solution of hydrogen bromide was added. The mixture was concentrated to dryness under vacuum and the gummy residue was crystallized from a mixture of methanol and acetone to give 4-(4 - dimethylaminophenethylamino)-1,3-dimethylpiperidine trihydrobromide, M.P. 247–249°. A small portion was recrystallized from the same solvent mixture and a melting point of 251–252° was obtained. T.L.C. and N.M.R. indicate a 50:50 cis-trans mixture.

*Analysis.*—Cal'd for $C_{17}H_{29}N_3 \cdot 3HBr$ (M.W. 518) (percent): C, 39.38; H, 6.18. Found (percent): C, 39.30; H, 5.81.

Methylation with formaldehyde and formic acid in analogy to the process of Example 7 gives 4-(N-methyl-4-dimethylaminophenethylamino) - 1,3 - dimethylpiperidine.

EXAMPLE 35

Preparation of 1,3-dimethyl-4-(2,2-diphenethylamino) piperidine (cis isomer)

A solution of 15 g. of 2,2-diphenylethylamine, 12 g. of 1,3-dimethylpiperidone-4 and 100 ml. of benzene was refluxed and stirred for 8 hrs.; 1.1 ml. of water was removed from the reaction mixture by means of a Dean-Stark water trap. The benzene was evaporated from the reaction mixture under reduced pressure and the residue was placed in a low pressure hydrogenation bottle. Platinum oxide (0.2 g.) and enough methanol to bring the total volume up to 180 ml. were added. After shaking under an atmosphere of hydrogen (initial pressure 58 lbs. per sq. in.) at room temperature for 1 hr., the theoretical amount of hydrogen had been reacted and the shaking was stopped. The catalyst was filtered from the solution, after evaporating the methanol from the filtrate on a water bath, the residue was distilled to give 1,3-dimethyl-4-(2,2 - diphenethylamino)piperidine, B.P. 225–228°/6 mm.; $n_D^{26}=1.5615$. T.L.C. showed 2 substances and N.M.R. indicated a ratio of 10:1 cis-trans isomers. An excess of an ether solution of malonic acid was added to a solution of 4.5 g. of the distillate in ether. Following filtration and recrystallization from a solution of ethyl acetate and methanol, the malonate was obtained, M.P. 113–114°. T.L.C. still showed 2 isomers with the cis-trans ratio greater than 10:1.

*Analysis*—Calc'd for $C_{21}H_{28}N_2 \cdot 2(C_3H_4O_4)$ (M.W. 516.6) (percent): C, 62.78; H, 7.03; N, 5.42. Found (percent): C, 62.45; H, 7.02; N, 5.25.

Methylation with formaldehyde and formic acid in analogy to the process of Example 7 gives 4-(N-methyl-2,2-diphenethylamino)-1,3-dimethylpiperidine.

EXAMPLE 36

Preparation of 4-(p-chlorophenethyl-N-methylamino)- 1,2,5,6-tetrahydro-1,3-dimethylpyridine A solution of 20 g. of 2-(4 - chlorophenethyl)-N-methylamine, 16.5 g. of 1,3-dimethylpiperidone-4, 120 ml. of toluene and 0.2 g. of p-toluenesulfonic acid was stirred under reflux. Aftter 24 hrs. 1.3 ml. of water had been removed from the reaction mixture by means of a Dean-Stark water trap and following concentration of the mixture on a water bath under reduced pressure, the residue was distilled to give the 4-(p-chlorophenethyl-N-methylamino) - 1,2,5,6 - tetrahydro - 1,3-dimethylpyridine product, B.P. 209–210° at 14 mm.; $n_D^{25}=1.5405$.

Preparation of 4-(4 - chloro - N - methylphenethylamino)- 1,3-dimethylpiperidine (cis-trans isomers). Enamine reduction with $PtO_2/H_2$ A mixture of 4 g. of 4-(p-chlorophenethyl-N-methylamino)-1,2,5,6 - tetrahydro - 1,3 - dimethylpyridine, 180 ml. of methanol and 0.1 g. of platinum oxide was shaken in an atmosphere of hydrogen (initial pressure 56 lbs. per sq. in.) at room temperature. After 1.5 hrs. the theoretical amount of hydrogen had reacted. The catalyst was filtered from the mixture and following evaporation of the methanol, the residue was distilled to give 4-(4-chloro-N-methylphenethylamino)-1,3 - dimethylpiperidine (cis-trans isomers), B.P. 200–202° at .3 mm.; $n_D^{25}=1.5319$. V.P.C. analysis indicated 85 percent cis and 15 percent trans.

Preparation of 4-(4 - chloro - N - methylphenethylamino)- 1,3-dimethylpiperidine (cis-trans isomers). Enamine reduction with formic acid.

Over the course of 10 min. 4 g. of 4-(p-chlorophenethyl - N - methylamino) - 1,2,5,6-tetrahydro-1,3-dimethylpyridine was added dropwise to 1 ml. of stirred formic acid. During the addition with no external heat added, the internal temperature became 75°. Also, carbon dioxide was expelled from the reaction mixture. Following the addition, the reaction was stirred between 70–80° for 2 hrs. The mixture was cooled to room temperature and poured onto 100 g. of ice. The mixture was made strongly alkaline with 6 N sodium hydroxide and extracted with ether. The ether extract was washed by extraction with water and dried over anhydrous sodium sulfate. Following filtration of the desiccant and evaporation of the ether, the residue was distilled under reduced pressure to give 4-(4 - chloro - N - methylphenethylamino) - 1,3 - dimethylpiperidine (cis-trans isomers), $n_D^{23}=1.5348$. V.P.C. analysis showed 10 percent trans and 90 percent cis in distillate.

EXAMPLE 37

Preparation of 4-(N-acetyl-N-methylamino)-1,3-dimethyl-1,2,5,6-tetrahydopyridine Acetic anhydride (37 g.) was added to a stirred solution of 46 g. of 1,3-dimethyl-4-methyliminopiperidine and 150 ml. of pyridine. After the solution had stirred at 100° C. for 6 hrs., the volatile components were removed under reduced pressure in a water bath. Water (100 ml.) and 200 g. of ice were added to the residue and the cold mixture made alkaline with 6 N sodium hydroxide. The liberated base was extracted with chloroform. The chloroform solution was washed by extraction with water and dried over anhydrous sodium sulfate. Following removal of the desiccant by filtration and evaporation of the chloroform, the residue was distilled to give 4-(N-acetyl-N-methylamino)-1,3-dimethyl-1,2,5,6-tetrahydropyridine; B.P. 146–152°/18 mm.; $n_D^{24}$=1.4924. The distillate was dissolved in ethanol and an excess of cold 6 N alcohol hydrogen chloride was added. Several volumes of ether was added to induce crystallization. Following filtration and drying, the hydrochloride was obtained, M.P. 217–218°. Recrystallization from a solution of ethanol and ether gave the hydrochloride having melting point 219–220°. N.M.R. showed a

singlet.

Analysis.—Calc'd for $C_{10}H_{18}N_2O \cdot HCl$. (M.W. 218.7) (percent): N, 12.81. Found (percent): N, 12.81.

EXAMPLE 38

Preparation of 4-(N-acetyl-N-methylamino)-1,3-dimethylpiperidine

A mixture of 10 g. of 4-(N-acetyl-N-methylamino)-1,2,4,5-tetrahydro-1,3-dimethylpyridine hydrochloride, 1 g. of 5 percent rhodium on carbon and 35 ml. of methanol was shaken under an atmosphere of 1000 lbs. of hydrogen at 100° C. for 10 hrs. After the reaction had cooled to room temperature, the catalyst was removed by filtration and the methanol was evaporated from the solution. Following crystallization from ethyl acetate and methanol there was obtained 4-(N-tcetyl-N-methylamino)-1,3-dimethylpiperidine, M.P. 232–234°. N.M.R. gave a >CH—CH$_3$ doublet.

Analysis.—Cal'd for $C_{10}H_{20}N_2O \cdot HCl \cdot 0.5H_2O$ (M.W. 229.5) (percent): C, 52.40; H, 9.60; N, 12.21. Found (percent): C, 52.60; H, 9.32; N, 12.48.

EXAMPLE 39

This example illustrates exemplary pharmaceutical formulations of the novel end products of this invention.

Suppository formulation

| | Gms. per 1.3 gm. suppository |
|---|---|
| 4-(4-chloro-N-methylphenethylamino)-1,3-dimethylpiperidine (α-isomer)[1] dihydrochloride dihydrate | 0.010 |
| Wecobee M (E. F. Drew Company, N.Y., N.Y.) | 1.245 |
| Carnauba wax | 0.045 |

[1] Trans isomer.

Procedure (1) The Wecobee M and the carnauba wax were melted in a suitable size glass lined container (stainless steel may also be used), mixed well and cooled to 45° C.

(2) The 4 - (4-chloro - N-methylphenethylamino)-1,3-dimethylpiperidine (α-isomer) dihydrochloride dihydrate, which had been reduced to a fine powder with no lumps, was added and stirred until completely and uniformly dispersed.

(3) The mixture was poured into suppository molds to yield suppositories having an individual weight of 1.3 gms.

(4) The suppositories were cooled and removed from molds. They were then individually wrapped in wax paper for packaging (foil may also be used).

Capsule formulation

| | Mg. per capsule |
|---|---|
| 4-(4-chloro-N-methylphenethylamino) 1,3-dimethylpiperidine (α-isomer) dihydrochloride dihydrate | 10 |
| Lactose, U.S.P. | 165 |
| Corn starch, U.S.P. | 30 |
| Talc, U.S.P. | 5 |
| Total weight | 210 |

Procedure (1) 4-(4-chloro-N-methylphenethylamino)-1,3-dimethylpiperidine (α-isomer)dihydrochloride dihydrate, lactose, and corn starch were mixed in a suitable mixer.

(2) The mixture was further blended by passing through a Fitzpatrick Comminuting Machine with a No. 1A screen with knives forward.

(3) The blended powder was returned to the mixer; the talc added and blended thoroughly.

(4) The mixture was filled into No. 4 hard shell gelatin capsules on a Parke Davis capsulating machine. (Any similar type capsulating machine may be used.)

Tablet formulation

| | Mg. per tablet |
|---|---|
| 4-(4 chloro - N - methylphenethylamino)-1,3-dimethylpiperidine (α - isomer) dihydrochloride dyhydrate | 5.10 |
| Lactose | 114.50 |
| Corn starch | 47.90 |
| Amijel BO–11 [2] | 10.00 |
| Calcium stearate | 2.50 |

[2] A pre-hydrolyzed food grade corn starch, available from Corn Products Co., New York, N.Y. Any similar pre-hydrolyzed corn starch may be used.

Procedure (1) 4-(4-chloro-N-methylphenethylamino)-1,3 - dimethylpiperidine (α-isomer) dihydrochloride dihydrate, lactose, corn starch and Amijel BO–11 were blended in a suitable mixer.

(2) The mixture was granulated to a heavy paste with water and comminuted using a suitable granule size (No. 12 screen) and dried at 110° F. for approximately 32 hours.

(3) The dry granules were comminuted to a suitable mesh size (No. 16 screen) and transferred to a suitable mixer. The calcium stearate was added and mixed until uniform.

(4) The granules were compressed at a tablet weight of 180 mg. using punches having a diameter of 5/16″. The tablets may be either flat or bi-convex and may be scored if desired.

Parenteral formulation

4 - (4 - chloro-N-methylphenethylamino)-1,3-dimethyl piperidine (α-isomer) dihydrochloride dihydrate was not stable in solution under extended storage conditions. It was therefore prepared in duplex ampuls, one containing the dry drug and the other containing water for injection. U.S.P.

4 - (4 - chloro - N-methylphenethylamino)-1,3-dimethyl piperidine (α-isomer) dihydrochloride dihydrate (dry fill ampul 50 cc.)—25 mg.

A parenteral grade of the drug, fiber free, was filled into the ampul using a Diehl Mater electric filler or other suitable type filler. The ampuls were sealed and sterilized at 255° F. for 2 hours.

Immediately before use the powder was solubilized with the following solution: water for injection, U.S.P.—5 cc.

We claim:
1. A compound of the formula

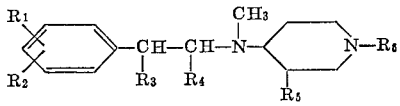

wherein $R_1$ and $R_2$ are each independently selected from the group consisting of hydrogen, halogen, trifluoromethyl, lower alkyl, lower alkoxy, nitro, amino, lower alkylamino and di-lower alkylamino; $R_5$ is hydrogen, lower alkyl or phenyl-lower alkyl; $R_6$ is lower alkyl or phenyl-lower alkyl; and $R_3$ and $R_5$ are each independently selected from the group consisting of hydrogen, lower alkyl, phenyl and phenyl-lower alkyl.

2. A trans isomer of a compound according to claim 1 wherein $R_5$ is lower alkyl or phenyl-lower alkyl.

3. The compound according to claim 1 wherein $R_1$ is chloro and is in para positions; $R_2$, $R_3$ and $R_4$ are each hydrogen and $R_5$ and $R_6$ are each methyl, i.e., the compound 4-(4-chloro - N - methylphenethylamino)-1,3-dimethylpiperidine.

4. The trans isomer of the compound according to claim 3, i.e., trans 4-(4-chloro-N-methylphenethylamino)-1,3-dimethylpiperidine.

5. The cis isomer of the compound according to claim 3, i.e., cis 4-(4-chloro-N-methylphenethylamino)-1,3-dimethylpiperidine.

6. The compound according to claim 1 wherein $R_1$ is chloro and is in para position; $R_2$, $R_3$ and $R_4$ are each hydrogen; $R_5$ is hydrogen and $R_6$ is methyl, i.e., the compound 4 - (4 - chloro - N-methylphenethylamino)-1-methylpiperidine.

7. The compound according to claim 1 wherein $R_1$ is chloro and is in para position; $R_2$, $R_3$ and $R_4$ are each hydrogen; $R_5$ is hydrogen and $R_6$ is benzyl, i.e., the compound 1 - benzyl - 4-(4-chloro-N-methylphenethylamino) piperidine.

8. The compound according to claim 1 wherein $R_1$ is chloro and is in para position; $R_2$ and $R_3$ are each hydrogen; $R_4$ is methyl; $R_5$ is hydrogen and $R_6$ is methyl, i.e., the compound 4-(4 - chloro - α,N - dimethylphenethylamino)-1-methylpiperidine.

9. The compound according to claim 1 wherein each of $R_1$, $R_2$, $R_3$, $R_4$ and $R_5$ are hydrogen and $R_6$ is methyl, i.e., the compound 1-methyl-4-(N-methylphenethylamino) piperidine.

10. The compound according to claim 1 wherein each of $R_1$, $R_2$, $R_3$, $R_4$ and $R_5$ are hydrogen and $R_6$ is benzyl, i.e., the compound 1-benzyl-4-(N-methylphenethylamino) piperidine.

11. The compound according to claim 1 wherein each of $R_1$, $R_2$, $R_3$ and $R_5$ are hydrogen and $R_4$ and $R_6$ are each methyl, i.e., the compound 4-(α,N-dimethylphenethylamino)-1-methylpiperidine.

12. The compound according to claim 1 wherein $R_1$ is methyl and is in para position; $R_2$, $R_3$, $R_4$ and $R_5$ are each hydrogen and $R_6$ is methyl, i.e., the compound 4 - (4-methoxy-N-methylphenethylamino)-1-methylpiperidine.

13. The compound according to claim 1 wherein $R_1$ is methyl and is in para position; $R_2$, $R_3$, $R_4$ and $R_5$ are each hydrogen and $R_6$ is methyl, i.e., the compound 1-methyl-4-(p,α-dimethylphenethylamino)piperidine.

14. The compound according to claim 1 wherein $R_1$ is chloro and is in para position; $R_2$, $R_3$, $R_4$ and $R_5$ are each hydrogen and $R_6$ is phenethyl, i.e., the compound 4 - (4-chloro-N-methylphenethylamino)-1-phenethylpiperidine.

15. The compound according to claim 1 wherein $R_1$ is nitro and is in para position; $R_2$, $R_3$, $R_4$ and $R_5$ are each hydrogen and $R_6$ is methyl, i.e., the compound 1-methyl-4-(N-methyl-4-nitrophenethylamino)piperidine.

16. The compound according to claim 1 wherein $R_1$ is chloro and is in para positions; $R_2$, $R_3$, $R_4$ and $R_5$ are each hydrogen and $R_6$ is secondary butyl, i.e., the compound 1-sec. butyl-4-(4-chloro - N - methylphenethylamino)piperidine.

17. The compound according to claim 1 wherein $R_1$ is chloro and is in para position; $R_2$, $R_3$ and $R_4$ are each hydrogen; $R_5$ is n-butyl and $R_6$ is methyl, i.e., the compound 3-butyl-4-(4-chloro - N - methylphenethylamino)-1-methylpiperidine.

18. The compound according to claim 1 wherein $R_1$ is chloro and is in para position; $R_2$, $R_3$ and $R_4$ are each hydrogen; $R_5$ is benzyl and $R_6$ is methyl, i.e., the compound 3 - benzyl - 4 - (4-chloro-N-methylphenethylamino)-1-methylpiperidine.

19. The compound according to claim 1 wherein $R_1$ is chloro and is in para position; $R_2$ is chloro and is in meta position; $R_3$ and $R_4$ are each hydrogen and $R_5$ and $R_6$ are each methyl, i.e., the compound 4-(3,4-dichloro-N-methylphenethylamino)-1,3-dimethylpiperidine.

20. The compound according to claim 1 wherein $R_1$ is bromo and is in para position; $R_2$, $R_3$ and $R_4$ are each hydrogen and $R_5$ and $R_6$ are each methyl, i.e., the compound 4-(4 - bromo - N - methylphenethylamino)-1,3-dimethylpiperidine.

21. The compound according to claim 1 wherein $R_1$ is chloro and is in para position; $R_2$, $R_3$ and $R_4$ are each hydrogen; $R_5$ is methyl and $R_6$ is phenethyl, i.e., the compound 4 - (4-chloro-N-methylphenethylamino)-3-methyl-1-phenethylpiperidine.

22. The compound according to claim 1 wherein $R_1$ is trifluoromethyl and is in para position; $R_2$, $R_3$ and $R_4$ are each hydrogen and $R_5$ and $R_6$ are each methyl, i.e., the compound 4-(4-trifluoromethyl - N - methylphenethylamino)-1,3-dimethylpiperidine.

23. A process for the preparation of a compound of the formula

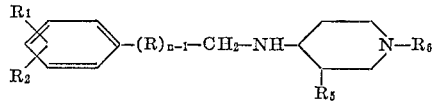

wherein $R_1$ and $R_2$ are each independently selected from the group consisting of hydrogen, halogen, trifluoromethyl, lower alkyl, lower alkoxy, nitro, amino, lower alkylamino and di-lower alkylamino; R is methylene or methylene substituted by a member selected from the group consisting of lower alkyl, phenyl, phenyl-lower alkyl, phenyl substituted by halogen, trifluoromethyl, lower alkyl, lower alkoxy, nitro, amino, lower alkylamino or di-lower alkylamino or phenyl-lower alkyl in which the phenyl nucleus is substituted by halogen, trifluoromethyl, lower alkyl, lower alkoxy, nitro, amino, lower alkylamino or di-lower alkylamino; $R_5$ and $R_6$ are each independently selected from the group consisting of lower alkyl and phenyl-lower alkyl; and $n$ is an integer from 1 to 4 which comprises treating a compound of the formula

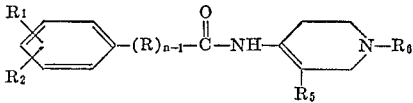

wherein $R$, $R_1$, $R_2$, $R_5$, $R_6$ and $n$ have the same meaning as above with lithium aluminum hydride-aluminum chloride.

References Cited

UNITED STATES PATENTS 2,496,958  2/1950  Reitsema ———————— 260—293

FOREIGN PATENTS 3,846  1/1966  France.

OTHER REFERENCES

Reitsema et al., J. Am. Chem. Soc., vol. 70, pp. 4009–4011 (1948).

Chemical Abstracts, vol. 52, col. 6340 (1958) (abstract of Chiavareli et al.).

JOHN D. RANDOLPH, Primary Examiner

U.S. Cl. X.R.

260—240, 293.2, 294, 294.7, 295, 296; 424—267

PO-1050
(5/69)

UNITED STATES PATENT OFFICE
CERTIFICATE OF CORRECTION

Patent No. 3,531,487      Dated September 29, 1970

Inventor(s) Berger, Corraz and Lee

It is certified that error appears in the above-identified patent and that said Letters Patent are hereby corrected as shown below:

Claim 3, column 35, line 29   "positions"

should be position

Claim 12, column 35, line 68   "methyl"

should be methoxy

Claim 16, column 36, line 11   "positions"

should be position

SIGNED AND
SEALED
DEC 22 1970

(SEAL)
Attest:

Edward M. Fletcher, Jr.
Attesting Officer

WILLIAM E. SCHUYLER, JR.
Commissioner of Patents